US011172406B2

(12) United States Patent
Hampali et al.

(10) Patent No.: US 11,172,406 B2
(45) Date of Patent: Nov. 9, 2021

(54) METHOD AND APPARATUS FOR PROVIDING NETWORK CONNECTIVITY IN A WIRELESS COMMUNICATION SYSTEM

(71) Applicant: Samsung Electronics Co., Ltd., Suwon-si (KR)

(72) Inventors: Mallikarjuna Hampali, Bangalore (IN); Pratyush Pushkar, Bangalore (IN); Mohan Rao Naga Santha Goli, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/839,671

(22) Filed: Apr. 3, 2020

(65) Prior Publication Data

US 2020/0322846 A1 Oct. 8, 2020

(30) Foreign Application Priority Data

Apr. 5, 2019 (IN) .............................. 201941013795

(51) Int. Cl.
| | |
|---|---|
| *H04W 28/24* | (2009.01) |
| *H04W 28/02* | (2009.01) |
| *H04L 12/857* | (2013.01) |
| *H04W 8/18* | (2009.01) |
| *H04L 12/927* | (2013.01) |
| *H04L 12/911* | (2013.01) |
| *H04L 12/801* | (2013.01) |

(52) U.S. Cl.
CPC ............ *H04W 28/24* (2013.01); *H04L 47/11* (2013.01); *H04L 47/2491* (2013.01); *H04L 47/805* (2013.01); *H04L 47/824* (2013.01); *H04W 8/18* (2013.01); *H04W 28/0268* (2013.01)

(58) Field of Classification Search
CPC ..... H04L 47/11; H04L 47/805; H04L 47/824; H04L 47/2491; H04W 4/50; H04W 8/18; H04W 8/183; H04W 28/24; H04W 48/08; H04W 48/18
See application file for complete search history.

(56) References Cited

U.S. PATENT DOCUMENTS

| 9,237,593 B2 * | 1/2016 | Kirveskoski .......... H04W 76/15 |
| 9,635,486 B2 | 4/2017 | Ford et al. |
| 10,694,369 B2 | 6/2020 | Park |

(Continued)

FOREIGN PATENT DOCUMENTS

| EP | 2 629 556 A1 | 8/2013 |
| KR | 10-2014-0086950 A | 7/2014 |

OTHER PUBLICATIONS

International Search Report dated Jul. 23, 2020, issued in International Application No. PCT/KR2020/004429.

*Primary Examiner* — Melanie Jagannathan
(74) *Attorney, Agent, or Firm* — Jefferson IP Law, LLP

(57) ABSTRACT

A method for operating a device in a wireless communication system is provided. The method includes receiving a plurality of embedded subscriber identity module (eSIM) profiles, each eSIM profile being associated with at least one quality of service (QoS) feature, performing a primary mapping between the plurality of eSIM profiles and applications available on the device based on QoS requirements of the applications, and performing transfer of data belonging to the applications using the mapped eSIM profiles corresponding to the primary mapping.

20 Claims, 20 Drawing Sheets

(56) References Cited

U.S. PATENT DOCUMENTS

| | | | |
|---|---|---|---|
| 2012/0099428 A1 | 4/2012 | Kamdar et al. | |
| 2012/0108206 A1* | 5/2012 | Haggerty | H04W 36/14 |
| | | | 455/411 |
| 2015/0296369 A1 | 10/2015 | Berionne et al. | |
| 2016/0020802 A1* | 1/2016 | Lee | H04W 12/069 |
| | | | 455/558 |
| 2016/0149903 A1* | 5/2016 | Suh | H04L 63/0428 |
| | | | 713/156 |
| 2016/0269891 A1* | 9/2016 | Chen | H04W 76/18 |
| 2016/0295544 A1* | 10/2016 | Jiang | H04W 8/205 |
| 2017/0041864 A1* | 2/2017 | Kaliner | H04W 8/205 |
| 2017/0164184 A1 | 6/2017 | Borse | |
| 2017/0244837 A1* | 8/2017 | Kim | H04W 4/50 |
| 2017/0332273 A1* | 11/2017 | Link, II | H04W 36/0027 |
| 2018/0176768 A1* | 6/2018 | Baek | H04W 8/205 |
| 2018/0213078 A1* | 7/2018 | Visuri | H04W 8/205 |
| 2019/0020756 A1* | 1/2019 | Karakkad Kesavan Namboodiri | H04L 43/16 |
| 2019/0098487 A1* | 3/2019 | Boettger | H04W 76/12 |
| 2019/0141525 A1* | 5/2019 | Coureau | H04W 12/37 |
| 2019/0223132 A1* | 7/2019 | Miao | H04W 76/15 |
| 2019/0253962 A1* | 8/2019 | Kiessling | H04W 76/10 |
| 2019/0289456 A1* | 9/2019 | Namiranian | H04W 4/70 |
| 2019/0387380 A1* | 12/2019 | Alamartimo | H04M 17/103 |
| 2020/0022193 A1* | 1/2020 | Ma | H04W 4/06 |
| 2020/0050439 A1* | 2/2020 | Bjordal | H04W 8/183 |
| 2020/0068388 A1* | 2/2020 | Xu | H04L 61/2061 |
| 2020/0178070 A1* | 6/2020 | Yang | H04W 12/48 |
| 2020/0236530 A1* | 7/2020 | Guday | H04W 4/70 |
| 2020/0305118 A1* | 9/2020 | Ryu | H04W 68/005 |

* cited by examiner

METHOD AND APPARATUS FOR PROVIDING NETWORK CONNECTIVITY IN A WIRELESS COMMUNICATION SYSTEM

CROSS-REFERENCE TO RELATED APPLICATION(S)

This application is based on and claims priority under 35 U.S.C. § 119(a) of an Indian Provisional patent application number 201941013795, filed on Apr. 5, 2019, in the Indian Patent Office, and of an Indian patent application number 201941013795, filed on Dec. 4, 2019, in the Indian Patent Office, the disclosure of each of which is incorporated by reference herein in its entirety.

BACKGROUND

1. Field

The disclosure relates to network connectivity in $5^{th}$ Generation (5G) communication systems. More particularly, the disclosure relates to a method and apparatus for providing network connectivity in a wireless communication system.

2. Description of Related Art

To meet the soaring demand with respect to wireless data traffic due to the commercialization of a 4th generation (4G) system and the increase of multimedia services, an improved 5G communication system or a pre-5G communication system is being developed. This is one reason why '5G communication systems' or 'pre-5G communication systems' are called 'beyond 4G network communication systems' or 'post Long-Term Evolution (LTE) systems.'

In order to increase a data transmission rate, 5G communication systems are being developed to be implemented in a super-high frequency band (millimeter wave (mmWave)), e.g., a band of 60 GHz. In order to reduce the path loss of radio waves in such a super-high frequency band and to increase a transmission distance of radio waves, various technologies for 5G communication systems are being discussed and studied, for example, beamforming, massive multiple-input multiple-output (MIMO), Full Dimensional MIMO (FD-MIMO), array antennas, analog beam-forming, and large-scale antennas.

Also, in order to improve system network performance for 5G communication systems, various technologies have been developed, e.g., evolved small cells, advanced small cells, cloud radio access networks (Cloud-RAN), ultra-dense networks, Device-to-Device communication (D2D), wireless backhaul, moving networks, cooperative communication, Coordinated Multi-Points (CoMP), and interference cancellation. Also, for 5G communication systems, other technologies have been developed, e.g., hybrid frequency-shift keying (FSK) and quadrature amplitude modulation (QAM) (FQAM) and Sliding Window Superposition Coding (SWSC), which are Advanced Coding Modulation (ACM) schemes, and Filter Bank Multi Carrier (FBMC), non-orthogonal multiple access (NOMA), and sparse code multiple access (SCMA), which are advanced access schemes.

The Internet has evolved from a human-based connection network, where humans create and consume information, to the Internet of Things (IoT), where distributed configurations, such as objects, exchange information with each other to process the information. Internet of Everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, Machine to Machine (M2M) communication, Machine Type Communication (MTC), etc. have been studied. In the IoT environment, intelligent Internet Technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of Cloud-RAN as a big data processing technology described above may be an example of convergence of 5G communication technology and IoT technology.

Currently, devices such as smartphones, Internet of Things (IoT) devices, wearable devices, and so on, may include a plurality of applications/services, with each of the plurality of applications/services having diverse connectivity requirements, particularly in terms of reliability, latency, throughput, bandwidth, security, and so on. In an example, a video streaming application may require high data rate, medium latency, and low security. In another example, a gaming application may require high data rate, low latency, and low security. In yet another example, a banking application may require medium data rate, high reliability, medium latency, and high security.

Currently, the devices may include embedded Subscriber Identity Module (eSIM) comprising of a plurality of profiles. Mobile Network Operators (MNOs) can provide services through the profiles of the eSIM. Users can download the eSIM profiles and receive the services provided by the network. The device can interact with the eSIM through a Local Profile Assistant (LPA) in the device. The devices can secure a plurality of profiles and enable at least one appropriate profile based on subscription charges and quality of connection. However, when a user enables a particular eSIM profile, data belonging to different applications and services, with varying requirements, is sent or received by the device through a single network pipe (path).

FIG. 1 illustrates an existing scenario, wherein data belonging to a plurality of applications is transferred through the same path according to the related art.

Referring to FIG. 1, data belonging to a plurality of applications 101 is transferred through the same network pipe 102 to a network 103 and Quality of Service (QoS) is ensured only at the device level.

FIG. 2 illustrates an example scenario, wherein a device 201 includes an eSIM comprising of profiles that can be linked with plans offered by MNOs according to the related art.

Referring to FIG. 2, the eSIM comprises of two profiles. Each eSIM profile can be linked to a particular MNO (MNO 1 or MNO 2), wherein each MNO can provide different plans. Currently, at a time instant, a single profile can be enabled on the eSIM. However, there can be multiple disabled profiles that can be enabled dynamically on-demand. The user can choose a plan that is provided by the MNO and link the chosen plan with a particular profile. The plans that are provided by a particular MNO allow transfer of data to the network (1 or 2) through a single pipe (202 or 235). The device may provide an option to manually switch subscriptions between the two profiles for transfer of data as per connectivity requirements. However, appropriate connectivity to each application/service for optimizing data usage experience and cost may not be provided. There may not be options that allow customizing subscriptions for each application/service in the device.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for providing network connectivity in a wireless communication system.

Additional aspects will be set forth in part in the description which follows and, in part, will be apparent from the description, or may be learned by practice of the presented embodiments.

In accordance with an aspect of the disclosure, methods and systems for providing differentiated network connectivity to applications/services in a device based on quality of service (QoS) requirements of the applications/services are provided. The methods and systems include associating QoS features (such as security, reliability, bandwidth, latency, and so on) with embedded subscriber identity module (eSIM) profiles in the device. The embodiments include mapping the applications/services with the eSIM profiles based on QoS requirements of the applications/services, wherein the QoS features associated with the eSIM profiles are similar to/same as the QoS requirements of the applications/services. The embodiments include monitoring the pattern of usage, behavior, context, content, and so on, of each of the applications/services. The embodiments include dynamically remapping the applications/services with the eSIM profiles based on pattern of usage, context, and content of the applications/services. The remapping involves switching from an existing mapping to a new mapping. The embodiments include prioritizing the applications/services that are associated with a particular eSIM profile for resolving conflicts, which may arise if multiple applications/services associated with the same eSIM profile attempt to transfer data at the same time. The embodiments include prioritizing the applications/services that are associated with different eSIM profiles for resolving conflicts, which may arise if a single eSIM profile in the device can be enabled at a particular time instant.

In accordance with another aspect of the disclosure, a method for operating a device in a wireless communication system is provided. The method includes receiving a plurality of embedded subscriber identity module (eSIM) profiles, each eSIM profile being associated with at least one quality of service (QoS) feature, performing a primary mapping between the plurality of eSIM profiles and applications available on the device based on QoS requirements of the applications, and performing transfer of data belonging to the applications using the mapped eSIM profiles corresponding to the primary mapping.

In accordance with another aspect of the disclosure, a device in a wireless communication system is provided. The device includes a transceiver, and a processor configured to control the transceiver to receive a plurality of embedded subscriber identity module (eSIM) profiles, each eSIM profile being associated with at least one quality of service (QoS) feature, perform a primary mapping between the plurality of eSIM profiles and applications available on the device based on QoS requirements of the applications, and perform transfer of data belonging to the applications using the mapped eSIM profiles corresponding to the primary mapping.

Before undertaking the DETAILED DESCRIPTION below, it may be advantageous to set forth definitions of certain words and phrases used throughout this patent document, the terms "include" and "comprise," as well as derivatives thereof, mean inclusion without limitation, the term "or," is inclusive, meaning and/or, the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like, and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
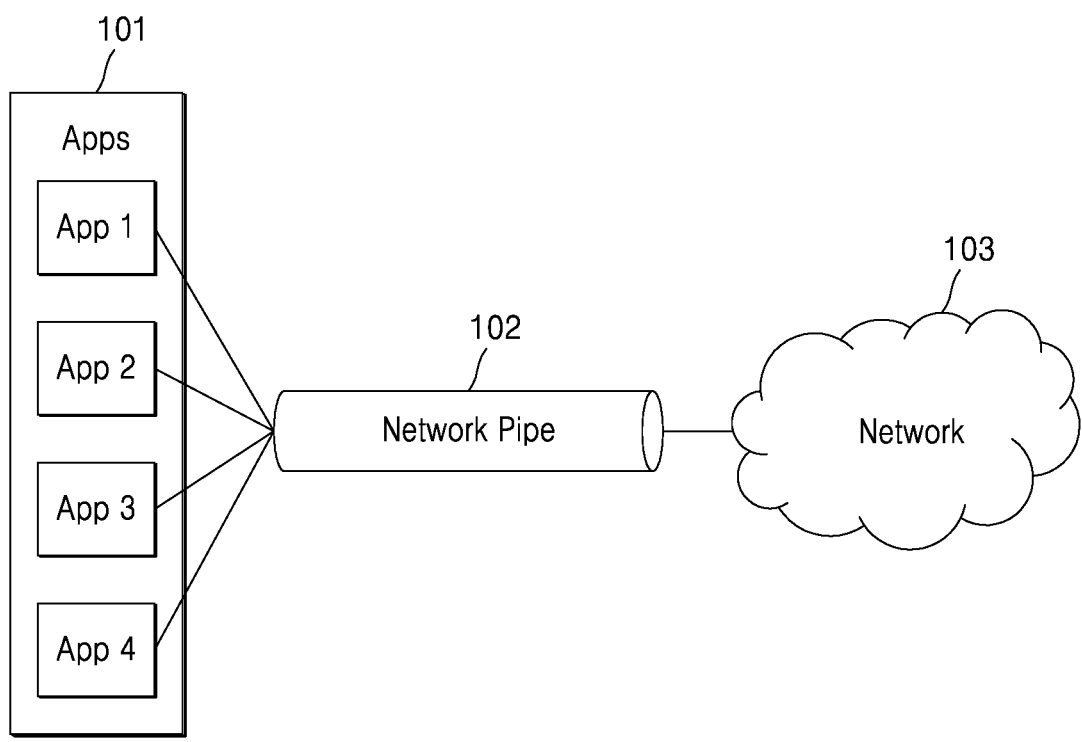
FIG. 1 illustrates an existing scenario, wherein data belonging to a plurality of applications is transferred through the same path according to the related art.
Figure 2:
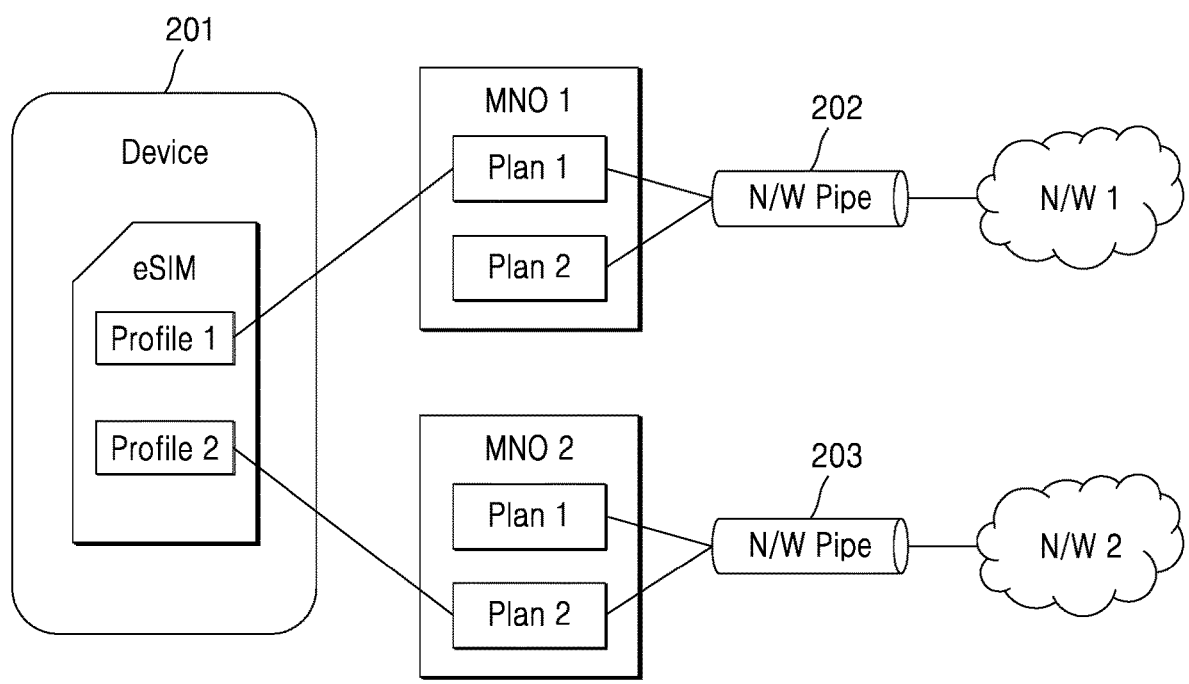
FIG. 2 illustrates an example scenario, wherein a device includes an embedded Subscriber Identity Module (eSIM) comprising of profiles that can be linked to plans offered by different Mobile Network Operators (MNOs) according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, embodiments of the disclosure will be described with reference to the accompany drawings. It should be understood, however, that the description is only illustrative, and is not intended to limit the scope of the disclosure. In addition, the description of well-known structures and techniques are omitted in the following specification in order to avoid unnecessarily obscuring the concept of the disclosure.

It is to be understood by those skilled in the art that singular forms "a", "an", "the" and "said" used herein may also include plural forms unless otherwise indicated. It is to be further understood that the phrase "include/comprise" used in the specification indicates the presence of the said feature, integer, operation, element, and/or component, but does not exclude the presence or addition of one or more other features, integers, operations, elements, and/or components. It is to be understood that when an element is referred to as being "connected" or "coupled" to another element, it may be directly connected or coupled to the other element or there may be an intermediate element therebetween. Further, the phrase "connection" or "coupling" as used herein may include a wireless connection or a wireless coupling. The phrase "and/or" as used herein may include all or any of the one or more associated terms listed and all combinations thereof.

Those skilled in the art will appreciate that all the terms (including technical and scientific terms) used herein have the same meaning as that is commonly understood by those skilled in the art to which the disclosure belongs, unless otherwise defined. It should also be understood that terms such as those defined in a general dictionary should be understood to have the meaning being in consistent with the meaning in the context of the prior art, and will not be explained as idealized or excessively formal meaning, unless specifically defined as herein.

Those skilled in the art may understand that the phrases "terminal" and "terminal device" as used herein include not only a radio signal receiver device, which is a device only having a radio signal receiver without a transmitting capability, but also a device with receiving and transmitting hardware, which is a device having receiving and transmitting hardware capable of performing a bidirectional communication over a bidirectional communication link. Such a device may include a cellular or other communication device having a single line display or a multi-line display or a cellular or other communication device without a multi-line display; a Personal Communication Service (PCS), which may combine voice, data processing, fax and/or data communication capabilities; a Personal Digital Assistant (PDA), which may include a Radio Frequency (RF) receiver, a pager, Internet/Intranet access, a web browser, a notepad, a calendar, and/or a Global Positioning System (GPS) receiver; a laptop of the related art and/or palmtop computer or other device, which may be a laptop of the related art and/or palmtop computer or other device having and/or including an RF receiver. The "terminal" and "terminal device" as used herein may be portable, transportable, installed in a vehicle (of aviation, maritime, and/or land), or may be adapted and/or configured to operate locally, and/or may operate in a distributed form on the earth and/or at any other locations in space. The "terminal" and "terminal device" used herein may also be a communication terminal, an Internet terminal, a music/video playing terminal, such as a PDA, a Mobile Internet Device (MID), and/or a mobile phone having a music/video playback function, or a smart TV, a set-top box and other devices.

The principal aspect of the embodiments herein is to disclose methods and systems for providing differentiated network connectivity to applications/services in a device based on Quality of Service (QoS) requirements of the applications/services, wherein the differentiated network connectivity is provided using embedded Subscriber Identity Module (eSIM) profiles and network slicing.

Another aspect of the embodiments herein is to map the applications/services with eSIM profiles associated with QoS features, wherein the QoS requirements of the applications/services are similar to/same as the QoS features associated with the eSIM profiles, wherein the applications/services can send or receive data using the eSIM profiles.

Another aspect of the embodiments herein is to dynamically remap the applications/services with the eSIM profiles based on pattern of usage, context, behavior, and content of the applications/services, wherein the usage, context, behavior, and content of the applications/services can be monitored in order to determine the optimal eSIM profile that can be remapped with the applications/services.

Another aspect of the embodiments herein is to prioritize the applications/services to resolve conflicts, wherein the conflicts can arise if applications/services associated with the same eSIM profile attempt to transfer data at the same time, and if the applications/services associated with different eSIM profiles attempt to transfer data at the same time, if a single eSIM profile can be enabled at a particular time instant.

Accordingly, the embodiments herein provide systems and methods for connectivity management service across multiple application(s) within the electronic device.

Accordingly, the embodiments herein provide systems and methods for dynamically mapping each application to an e-SIM profile, which in turn gets mapped to a network slice (such as 5G network slice) by carriers.

Accordingly, the embodiments herein provide systems and methods for providing to a user to dynamically switch profile during the application usage.

Accordingly, the embodiments herein provide systems and methods for dynamically changing profile mapping based on periodically learned/analyzed data from an application usage, a user behavior, and an application context.

Embodiments herein disclose methods and systems for providing differentiated network connectivity to applications and services in a device based on Quality of Service (QoS) requirements of the applications and services, wherein the differentiated network connectivity is provided using embedded Subscriber Identity Module (eSIM) profiles and network slicing.

Referring now to the drawings, and more particularly to FIGS. 3 to 8, 9A to 9F, 10A and 10B, and 11 to 14, where similar reference characters denote corresponding features consistently throughout the figures, there are shown preferred embodiments.

Figure 3:
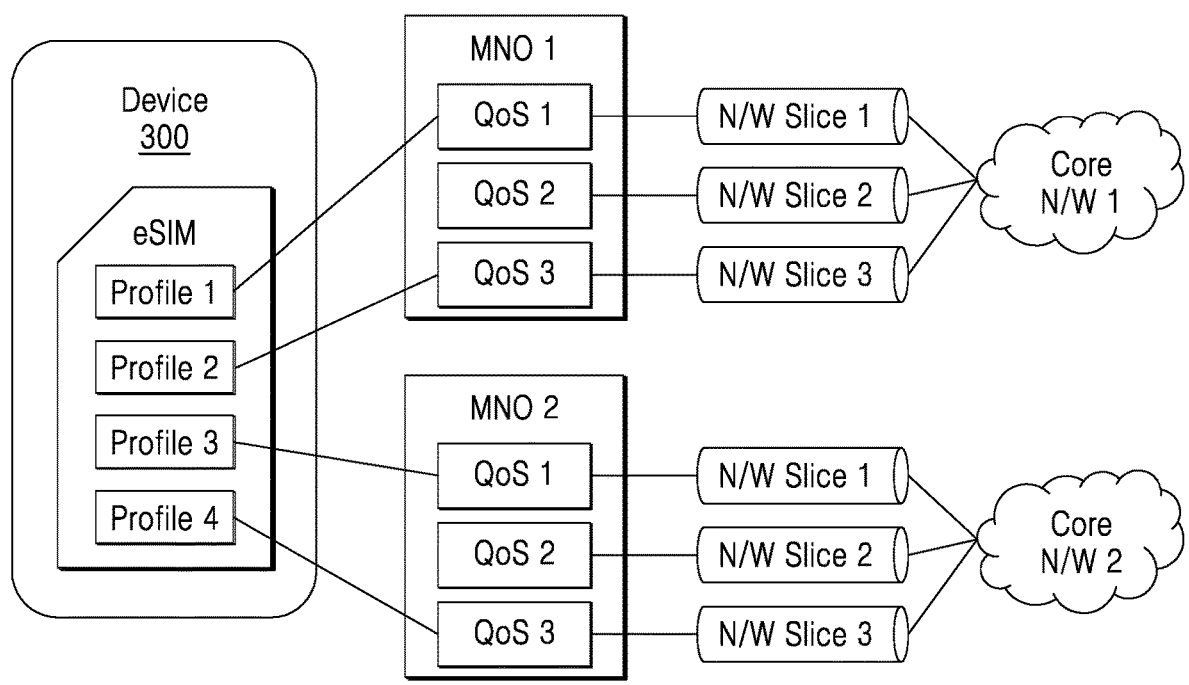
FIG. 3 illustrates an example device configured for providing differentiated network connectivity to applications and services using eSIM profiles and network slicing, according to an embodiment of the disclosure.

FIG. 3 illustrates an example device 300 configured for providing differentiated network connectivity to applications and services using eSIM profiles and network slicing, according to an embodiment of the disclosure. The device 300 can include an eSIM, wherein the eSIM comprises a plurality of profiles and each profile can be linked with a Mobile Network Operator (MNO).

Referring to FIG. 3, the device 300 includes an eSIM comprising of four profiles, viz., profile 1, profile 2, profile 3, and profile 4. The profiles 1 and 2 can be linked to an MNO 1. The profiles 3 and 4 can be linked to an MNO 2. There can be a default profile, wherein the default profile can be used by applications/services not having specific QoS requirements.

Each of the profiles of the eSIM can be associated with at least one QoS feature. Examples of the QoS features can be, but not limited to, bandwidth, security, latency and so on. For example, each of the profiles of the eSIM can be associated with QoS features, QoS 1, QoS 2, and QoS 3. Consider that the profile 1 is associated with high bandwidth, profile 2 is associated with high security, profile 3 is associated with low latency, and profile 4 is a default profile. The profile 4 can be used by applications/services not having specific QoS requirements.

The MNOs 1 and 2 may provide plans that are suitable to fulfill QoS requirements (QoS 1, QoS 2, and QoS 3) of different applications and services in the device 300. The applications and services are available in the device 300, which can include installed applications/services and/or system applications/services. Each plan of an MNO can be linked to a profile. Consider that plan 1 offered by MNO 1 is a high bandwidth plan (QoS 1) and is linked to profile 1. The plan 3 offered by MNO 1 is a high security plan (QoS 3) and is linked to profile 2. The plan 1 offered by MNO 2 is a low latency plan (QoS 1) and is linked to profile 3. The plan 2 offered by MNO 2 is a default (4G) (QoS 3) plan and is linked to profile 4. Users subscribed to a particular plan can transfer data using the profiles of the eSIM.

Based on usage, content, context, behavior, and so on, of the applications and services, the QoS requirements of the applications and services can be determined. Based on the QoS requirements, the applications and services can be mapped to eSIM profiles associated with QoS features for enabling data transfer. In 5G communication systems there are network slices for transfer of data, wherein different applications and services having specific QoS requirements can utilize appropriate network slices for transfer of data such that the QoS requirements are satisfied. The data that is transferred using the eSIM profiles, associated with specific QoS features, can be forwarded through the network slices facilitating the fulfillment of the QoS requirements of the applications and services.

Figure 4:
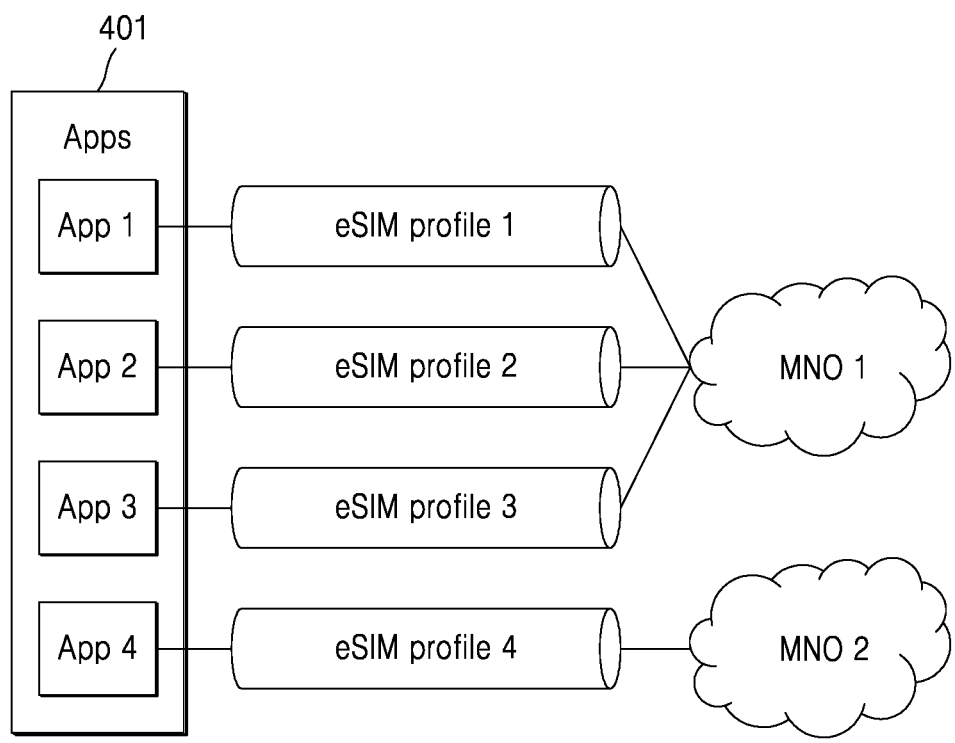
FIG. 4 illustrates an example data transmission by a plurality of applications using dedicated eSIM profiles associated with Quality of Service (QoS) features, according to an embodiment of the disclosure.

FIG. 4 illustrates an example data transmission by a plurality of applications 401 using dedicated eSIM profiles, according to an embodiment of the disclosure.

Referring to FIG. 4, there are four eSIM profiles associated with QoS features. The embodiments include mapping at least one application/service with an eSIM profile. An application/service can be mapped with an eSIM profile, if there is a similarity between the QoS feature associated with the eSIM profile and the QoS requirements of the application/service. This mapping can be referred to as primary mapping. The mapping of an application/service with an eSIM profile can be dynamic, i.e., the mapping can be updated based on variations in QoS requirements of the application/service. The QoS requirements of the applications and services can vary due to usage pattern, behavior, changes in context and content of the applications and services. The usage pattern of the applications and services, content, and context (such as the device is in power saving mode, application or service is running in incognito mode, and so on) can be monitored over a period of time. Based on the monitoring, the current QoS requirements can be identified. Based on the current QoS requirements, the applications and services can be dynamically remapped with the eSIM profiles associated with appropriate QoS features. The remapping can be referred to as secondary mapping. The data to be transmitted through the eSIM profiles can be forwarded through the network slices such that QoS requirements of the applications and services are satisfied.

Figure 5:
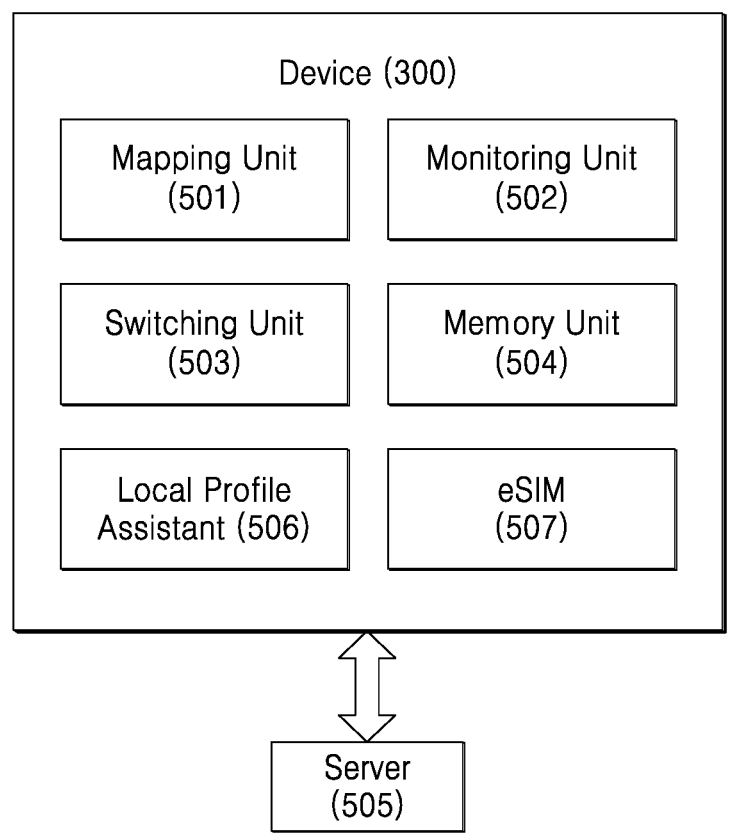
FIG. 5 illustrates various units of the device configured to provide differentiated connectivity to applications and services in the device using eSIM profiles and network slicing, according to an embodiment of the disclosure.

FIG. 5 illustrates various units of the device 300 configured to provide differentiated connectivity to applications and services in the device 300 using eSIM profiles and network slicing, according to an embodiment of the disclosure.

Referring to FIG. 5, the device 300 includes a mapping unit 501, a monitoring unit 502, a switching unit 503, and a memory unit 504. The device 300 can interact with a server 505. The device can include a Local Profile Assistant (LPA) 506, and at least one eSIM 507.

Examples of the device 300 can be, but not limited to, a smartphone, a wearable device, a tablet, a wearable device, an Internet of Things (IoT) device, a vehicle infotainment system, a connected vehicle, and so on. Each of the at least one eSIM 507 can include at least one downloaded profile. Each of the eSIM profiles can be associated with QoS features such as security, latency, throughput, reliability, bandwidth, and so on. The device 300 can include a plurality of applications and services, with each of the applications and services having specific QoS requirements. In an embodiment, the mapping unit 501 can be a Deep Neural Network (DNN) based classifier. In an embodiment, the server 505 can be an intelligent connectivity mapper server. The eSIM profiles can be mapped with network slices at a 5G core network, wherein the QoS features associated with the eSIM profiles are same/similar to the QoS features supported by the network slices.

The mapping unit 501 can map the applications and services, in the device 300, to the eSIM profiles based on QoS requirements of the applications and services. Initially, a seed mapping can be performed between the applications/services and the eSIM profiles. The mapping unit 501 can perform the seed mapping between each eSIM profile and each application/service, when the applications/services are used for the first time and/or usage pattern or behavior of the applications/services are not available. The seed mapping can be performed based on similarity/match between default QoS requirements of the applications/services and QoS features associated with the eSIM profiles.

The server 505 can identify the default QoS requirement of an application/service based on genre, category, description, permissions, and so on, of the application/service. The server 505 can associate the default QoS requirements with the applications/services. The device 300 can retrieve the default QoS requirements associated with applications/services in the device 300 from the server 505 (through at least one communication interface (not shown)). Once the seed mapping has been performed, data transfer (transmission/reception) by the applications/services can be performed using the eSIM profiles, with which the applications/services have been seed mapped. The similarity between the default QoS requirement of a particular application/service and the QoS feature associated with a particular eSIM profile allows meeting of the default QoS requirement of the particular application/service, if data transfer is performed using the eSIM profile.

In an example, for an instant messaging application, the default QoS requirement can be identified by the server 505 as 'low latency'. The device 300 can interact with the server 505 to determine the default QoS requirement of the instant messaging application. The default QoS requirement can be retrieved from the server, when the instant messaging application is installed for a first time and behavior, usage pattern, content, context, and so on, of the instant messaging application is not known. Once the default QoS requirement has been retrieved, the instant messaging application can be mapped, through seed mapping, with an eSIM profile associated with the QoS feature of low latency.

The monitoring unit 502 can monitor the pattern of usage, type of content, context, and so on, of each of the different applications/services in the device 300. The applications/services can be monitored using a monitoring framework. The pattern of usage can reveal the features of the applications/services that have been used. The pattern of usage can also reveal the time and location at which different features of the applications/services are used. The context can refer to the location/time at which/during which the applications/services are used, settings of the device 300 (such as device 300 is in power saving mode or not, amount of charge remaining in the battery of the device 300, screen mirroring is active or not, and so on), features of the applications/services used, genre and category of the applications/services in the device 300, and so on. The content can refer to type/quality of content viewed/accessed using the applications/services.

In an example, consider that the usage pattern of the instant messaging application is being monitored. Based on the monitoring, it is determined that in daytime, the instant messaging application is used for sending and receiving text messages, while in the evening and the nights, the instant messaging application is used for making video calls. Consider, it is determined that from 0200 hours to 1800 hours, the QoS requirement is low latency (for transmission and reception of text messages); and from 1801 hours to 0159 hours, the QoS requirement is high bandwidth (for making the video calls). Consider that it is observed that the received text messages include high quality (1080p/2144p) videos or links to videos of high quality.

The current QoS requirements of each of the applications and services can be determined based on at least one of usage pattern, context, and content of the applications and services. In an example, for the instant messaging application, downloading the videos or streaming the high quality videos may require high throughput or bandwidth.

The switching unit 503 can determine an optimal eSIM profile that can be mapped to an application/service based on the monitored usage pattern, determined context, content, and so on, of the application/service. The optimal eSIM profile can be determined based on similarities between QoS feature associated with the eSIM profile and the current QoS requirements of the application/service. Once the optimal eSIM profile has been determined, the switching unit 503 can dynamically remap the application/service with the optimal eSIM profile.

Consider that the instant messaging application was initially mapped to an eSIM profile associated with the low latency feature. Based on monitoring of the instant messaging application, the current QoS requirement is determined to be high bandwidth. In this scenario, the switching unit 503 can dynamically switch the previous mapping (between the low latency eSIM profile and the instant messaging application) and perform a mapping between an eSIM profile associated with the high bandwidth QoS feature and the instant messaging application.

In an embodiment herein, the priorities can be assigned to applications/services, which can be overridden by a user of the device 300. The priorities can be assigned in order to resolve conflicts, which may arise if at least two applications or services mapped with the same eSIM profile attempt to transfer data at the same time; and if a single profile can be enabled at a particular time instant, and at least two profiles, mapped with at least two eSIM profiles, attempt to send/receive data at the same time. The switching unit 503 can choose a particular application/service based on the priorities, if multiple applications/services mapped to the same eSIM profile are launched by the user. The switching unit 503 can also prevent the launch of an application/service (mapped with a first eSIM profile) while another application/service (mapped with a second eSIM profile) is running, if the device allows only one eSIM profile to be activated or used at a particular time instant.

The switching unit 503 can switch the mapping (or perform remapping) between the eSIM profiles and the applications/services in the device 300 through the LPA 506.

The memory unit 504 can store logs of history of eSIM-application/service map switching. The logs can include the features and logic used for determining the optimal eSIM profiles for the applications/services, time at which the switching is performed, and so on. The logs can be used for mapping the applications/services with the eSIM profiles in the future. The logs can also be sent to the server 505 to improve the methods used for associating default QoS requirements with different applications/services, thereby improving the seed mapping procedure.

FIG. 5 shows various units of the device 300, but it is to be understood that other embodiments are not limited thereon. In other embodiments, the device 300 may include less or more number of units. Further, the labels or names of the units are used only for illustrative purpose and does not limit the scope of the disclosure. One or more units can be combined together to perform same or substantially similar function in the device 300.

Figure 6:
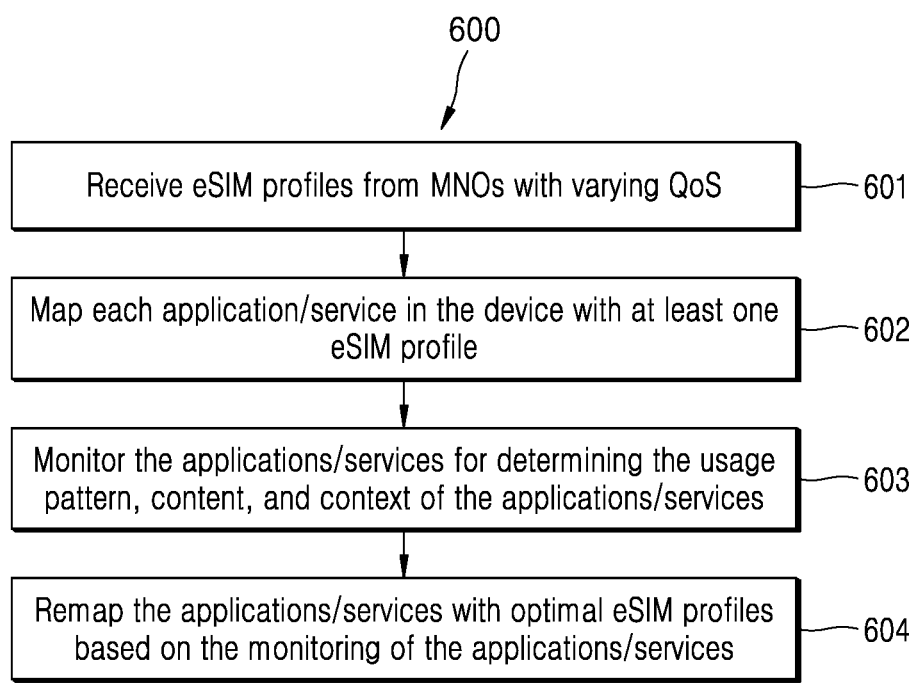
FIG. 6 is a flowchart illustrating a method for providing differentiated connectivity to applications and services in the device using eSIM profiles and network slicing, according to an embodiment of the disclosure.

FIG. 6 is a flowchart 600 illustrating a method for providing differentiated connectivity to applications and services in the device 300 using eSIM profiles and network slicing, according to an embodiment of the disclosure.

At operation 601, the method includes receiving eSIM profiles from MNOs. The eSIM profiles can be downloaded through the LPA 506. The embodiments include associating a QoS feature to an eSIM profile.

Referring to FIG. 6, consider that three eSIM profiles have been downloaded. The QoS features can be high bandwidth, high security, and low latency. The embodiments include associating high bandwidth with the first eSIM profile, high security with the second eSIM profile, and low latency with the third eSIM profile.

At operation 602, the method includes mapping each eSIM profile with one or more applications/services in the device 300. In an example, two applications, viz., a video streaming application and a social media application, can be mapped to the same eSIM profile, associated with the high bandwidth feature.

The initial mapping can be a seed mapping, which is performed based on the degree of similarity between a default QoS requirement of an application/service and the QoS feature associated with an eSIM profile, associated with the QoS feature. The embodiments include retrieving the default QoS requirement from the server 505, wherein the server 505 associates the default QoS requirement with the application/service based on, permissions, description, category, genre, and so on, of the application/service. Once the seed mapping has been performed, the embodiments include sending/receiving data belonging to the application/service through the eSIM profile.

At operation 603, the method includes monitoring the applications/services in the device 300 for determining the usage pattern, content, and context of the applications/services. The usage pattern can be determined by monitoring the features of each of the applications and services that are being used, time and location at which different features of the applications and services are used, amount of data consumed per session by the applications and services, and so on. The context can be determined based on the usage pattern, application/service settings, mode of usage of the applications/services, and so on. The content can be determined type and quality of content that is been viewed and accessed using the applications and services, data consumption by each of the applications and services, and so on.

The embodiments include determining the current QoS requirements of the applications and services in the device 300 based on at least one of the monitored usage pattern, content, context, and so on. The embodiments include determining an optimal eSIM profile that can be mapped with the applications and services based on the current QoS requirements of the applications and services.

At operation 604, the method includes remapping the applications and services with the optimal eSIM profiles based on the monitoring of the applications and services. In an embodiment, the remapping can be performed based on the priorities assigned to the applications and services. The remapping is performed if a high priority application/service, mapped to an eSIM profile, intends to send/receive data through the eSIM profile, while a low priority application/service is sending/receiving data through the same eSIM profile. However, the remapping may not be performed if the high priority application/service was sending/ receiving data through the eSIM profile and the low priority application/service intended to send/receive data through the same eSIM profile.

In an embodiment, if a single eSIM profile can be enabled and the high priority application/service and the low priority application/service are mapped to different eSIM profiles, the eSIM profile mapped to the high priority application/service is enabled.

The various actions in the flowchart 600 may be performed in the order presented, in a different order, or simultaneously. Further, in some embodiments, some actions listed in FIG. 6 may be omitted.

Figure 7:
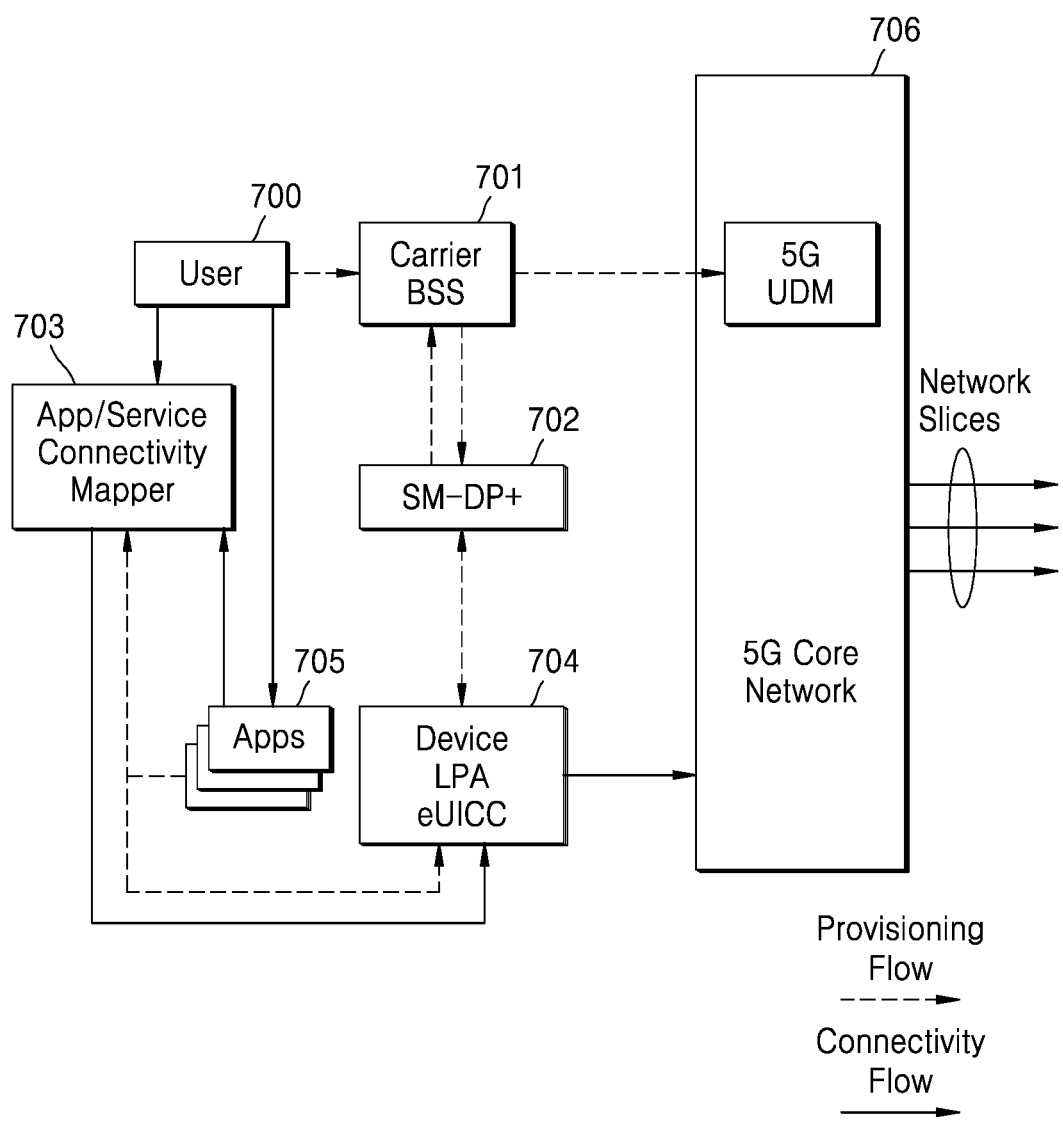
FIG. 7 illustrates a flow of information across different components of a system for providing differentiated network connectivity to applications and services in the device, according to an embodiment of the disclosure.

FIG. 7 illustrates a flow of information across different components of a system for providing differentiated network connectivity to applications and services in the device 300, according to an embodiment of the disclosure.

Referring to FIG. 7, the user 700 can request a Business Support System (BSS) 701 of an MNO for eSIM profiles. The eSIM profiles can be associated with QoS features. The eSIM profiles can be requested, if the user intends to use applications/services, having default QoS requirements, which are same/similar to the QoS features associated with the eSIM profiles. The QoS requirements of the applications/services are likely to be satisfied, if data is sent or received through the eSIM profiles.

The BSS 701 of the MNO can order the requested eSIM profiles from a Subscription Manager Data Preparation+ (SM-DP+) 702. The SM-DP+ can confirm the order and send an acknowledgement to the BSS. The LPA 704 (506, FIG. 5) can download the eSIM profiles and store the eSIM profiles in an embedded Universal Integrated Circuit Card (eUICC) or eSIM. The BSS can inform the 5G core network about the downloaded eSIM profiles. The eSIM profiles can be linked to a single subscriber ID. The 5G core network 706 can map the eSIM profiles with network slices, wherein the QoS features associated with the eSIM profiles are similar/same as the QoS features supported by the respective network slices.

An application/service connectivity mapper 703, which is a combination of the mapping unit 501, monitoring unit 502 and switching unit 503, can map the applications 705 and services to the downloaded eSIM profiles. The mappings can be overridden by the user, if necessary. When the user launches an application/service, data transfer can be performed using the eSIM profile mapped to the application/service. The data belonging to the application/service can flow through the appropriate network slice (mapped to the eSIM profile).

Figure 8:
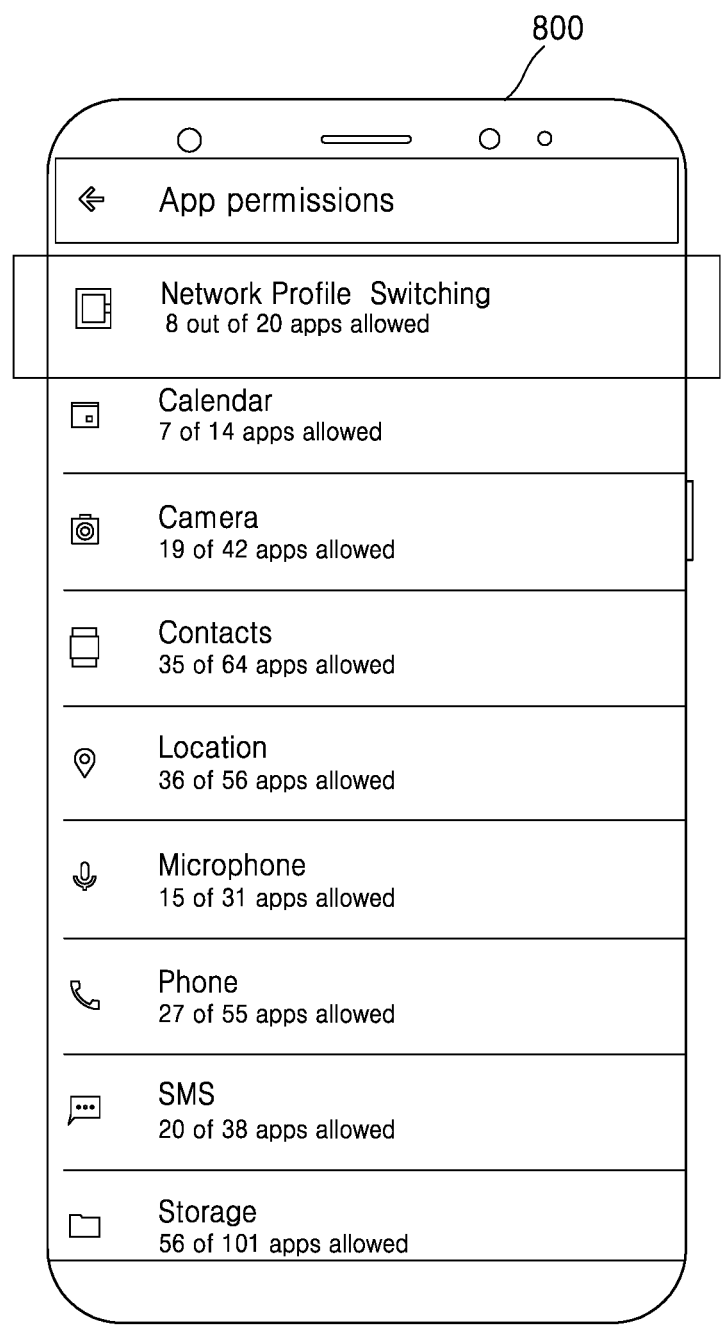
FIG. 8 illustrates a User Interface (UI) for providing permission to enable or disable network profile switching, according to an embodiment of the disclosure.

FIG. 8 illustrates a User Interface (UI) 800 for providing permission to enable or disable network profile switching, according to an embodiment of the disclosure.

In an embodiment, for each of the applications and services, permission can be acquired, based on which network profile switching feature can be either enabled or disabled. If the network profile switching is enabled, i.e., if the permission is granted, for a particular application/service, the embodiments include dynamically (re)mapping the application/service to other eSIM profiles based on current QoS requirements of the application/service. The network profile switching involves switching from a first eSIM profile-application/service mapping to a second eSIM profile-application/service mapping. The embodiments include monitoring the usage pattern, context, content, and so on, of each of the applications and services, for which the network profile switching feature is enabled.

Referring to FIG. 8, the UI enables the user to permit the device 300 (or grant the permission) to perform network profile switching. In an embodiment, the user can provide the permission when an application/service is launched for the first time. If the user does not grant the permission or an application/service, the network profile switching can be disabled, and the switching of eSIM profile-application/service mapping is not performed. The usage pattern, context, content, and so on, of the application/service may not be monitored. The seed mapping, initially performed based on the default QoS requirement of the application/service, can be maintained.

Figure 9A:
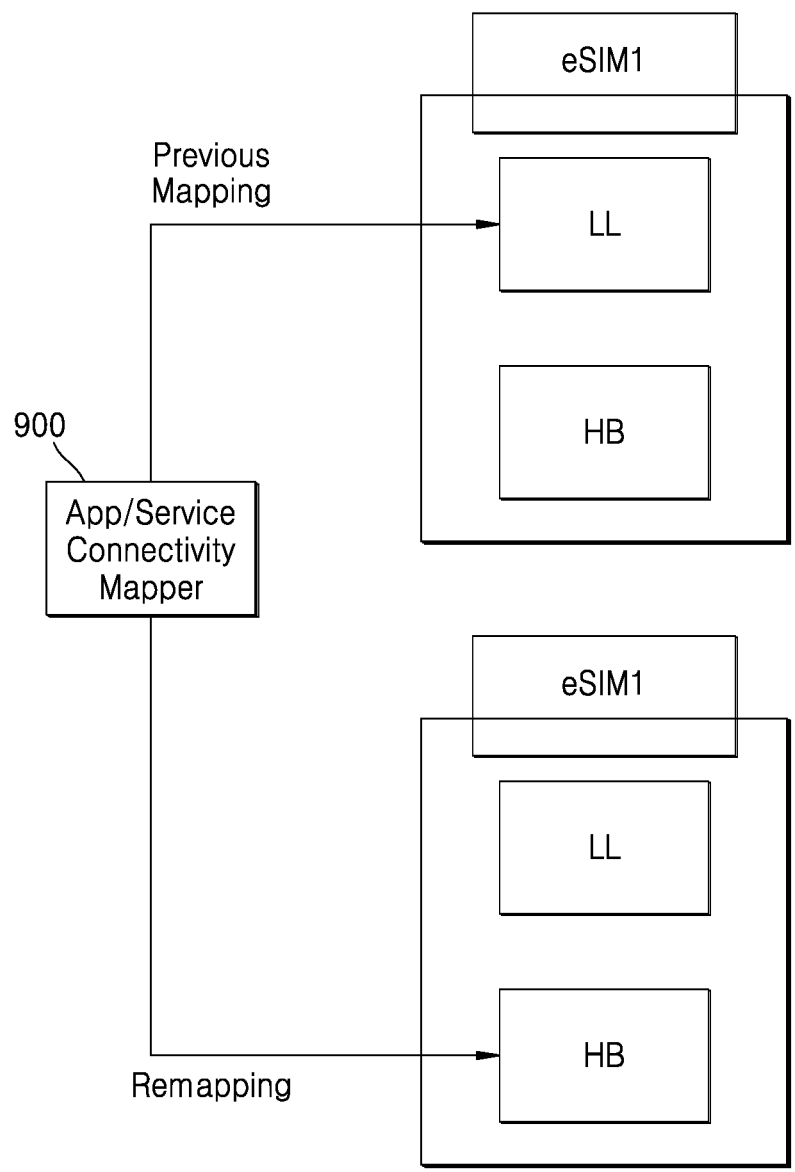
FIG. 9A is a use case scenario illustrating switching of an instant messaging application-eSIM profile mapping based on learning usage pattern of the instant messaging application, according to an embodiment of the disclosure.

FIG. 9A is a use case scenario illustrating switching of an instant messaging application-eSIM profile mapping by an application/service connectivity mapper 900 based on learning usage pattern of the instant messaging application, according to an embodiment of the disclosure.

In an example, the device 300 can include an eSIM (eUICC) 1 comprising of four profiles associated with four QoS features, viz., high bandwidth (labeled as HB), low latency (labeled as LL), high security (labeled as HS), and default (labeled as DF).

Referring to FIG. 9A, consider that the instant messaging application is initially mapped to the eSIM profile associated with the QoS feature of low latency. The mapping can be the seed mapping (performed based on the default QoS requirement, determined based on genre of the instant messaging application, when the user installs the instant messaging application or launches the instant messaging application for the first time), or a previous mapping performed based on monitoring the application usage.

The embodiments include monitoring the usage of the instant messaging application to learn the pattern of usage (sending and receiving text messages during the daytime and making video calls in the evening). The embodiments include determining an optimal eSIM profile associated with a QoS feature based on the latest QoS requirements of the instant messaging application, wherein the latest QoS requirements is same as/similar to the QoS feature of the optimal eSIM profile. Based on the usage pattern, the optimal profile is determined to be an eSIM profile associated with high bandwidth feature. Thereafter, the embodiments include switching from the eSIM profile associated with the low latency feature to the eSIM profile associated with high bandwidth feature. The embodiments include performing a mapping between the instant messaging application and high bandwidth eSIM profile.

Figure 9B:
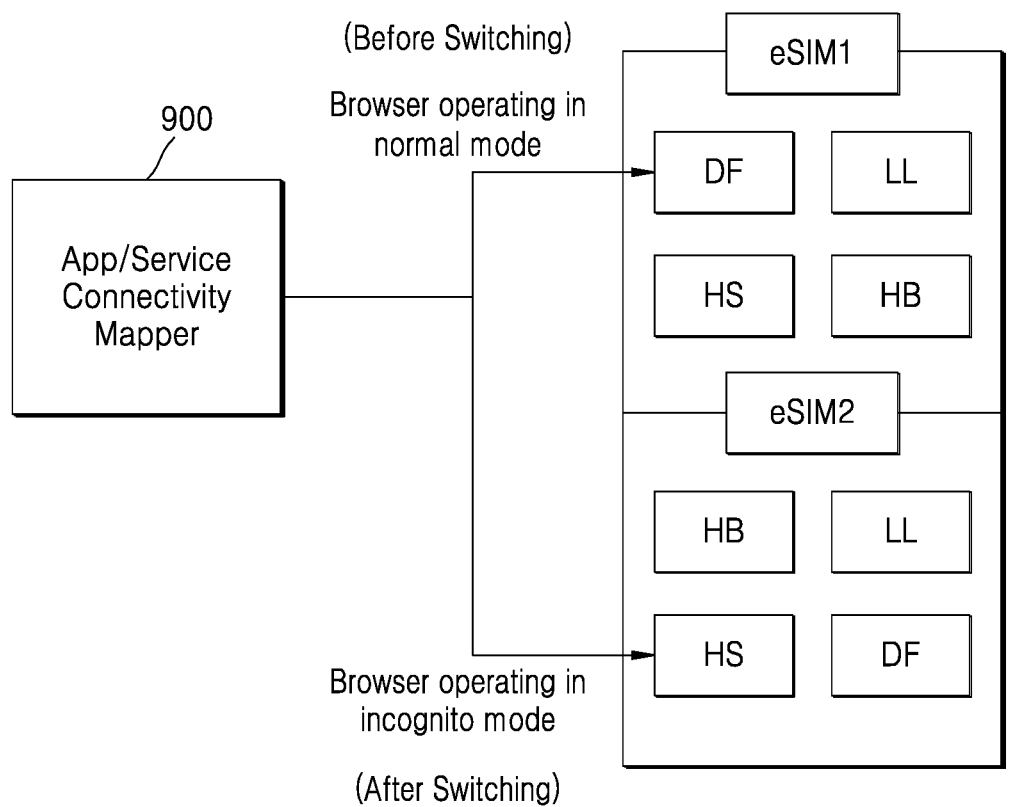
FIG. 9B is a use case scenario illustrating switching of a browser application-eSIM profile mapping based on context of the browser application, according to an embodiment of the disclosure.

FIG. 9B is a use case scenario illustrating switching of a browser application-eSIM profile mapping based on context of the browser application, according to an embodiment of the disclosure.

In an example, the device 300 can include two eSIMs (eUICCs), wherein each of the eSIMs comprises of four profiles, wherein the profiles in each of the eSIMs are associated with QoS features of high bandwidth, low latency, high security, and default.

Referring to FIG. 9B, consider that the browser application is initially mapped to the eSIM profile associated with the default QoS feature in the first eSIM. The mapping can be the seed mapping. The browser application can be initially mapped to the default eSIM profile, as the browser can be used for different purposes such as streaming videos, reading text, performing transactions, accessing audio files, and so on. For each of the purposes, the QoS requirements can be different. When the user installs the browser application or launches the browser application for the first time, the user behavior is not known), or a previous mapping performed based on monitoring the user behavior or activity as the browser application is used.

The embodiments include detecting a context change, wherein it is detected that the user has shifted from a general mode to an incognito mode for browsing. The latest QoS requirement is determined to be high security, as the browsing is being performed in the incognito mode. The embodiments include determining that the optimal eSIM profile is the eSIM profile associated with the QoS of high security. In an embodiment, the browser can operate in the incognito mode by switching from the eSIM profile associated with the default QoS feature to the eSIM profile associated with high security feature in the second eSIM. In another embodiment, the browser can operate in the incognito mode by transferring data through the eSIM profile associated with the high security feature in the first eSIM. For this scenario, the high security feature in the first eSIM can be enabled.

Figure 9C:
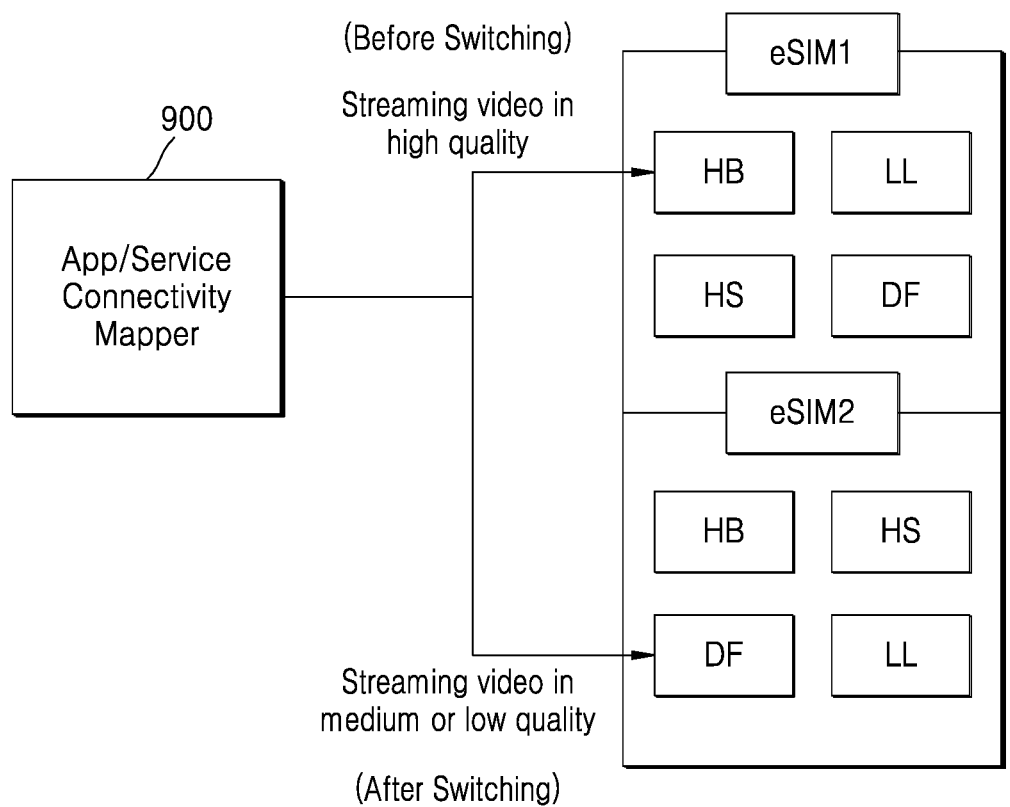
FIG. 9C is a use case scenario illustrating switching of a video streaming application-eSIM profile mapping based on content accessed using the video streaming application, according to an embodiment of the disclosure.

FIG. 9C is a use case scenario illustrating switching of a video streaming application-eSIM profile mapping based on content accessed using the video streaming application, according to an embodiment of the disclosure.

In an example, the device 300 can include two eSIMs (eUICCs), wherein each eSIM (eUICC) comprises of four eSIM profiles associated with QoS features of high bandwidth, low latency, high security, and default.

Referring to FIG. 9C, consider that the video streaming application is currently mapped to the eSIM profile, associated with the high bandwidth feature, in the first eSIM (eSIM 1). The mapping can be performed based on monitoring the usage of the video streaming application. It is determined that the user is viewing high quality videos using the video streaming application. Based on the content viewed by the user, the embodiments include determining that the current QoS requirement is high bandwidth. Therefore, the video streaming application can be mapped to the eSIM profile associated with the high bandwidth feature.

The embodiments include detecting a change in the viewed content, wherein it is detected that the user has shifted the quality of video from high quality to medium or low quality. The embodiments include determining that the optimal eSIM profile can be the eSIM profile associated with the default QoS feature in the first eSIM or second eSIM (eSIM 2). If the optimal eSIM profile is considered to be the eSIM profile associated with the default QoS feature in the second eSIM, the embodiments include switching from the eSIM profile associated with the high bandwidth feature to the eSIM profile associated with default QoS feature in the second eSIM. On the other hand, if the optimal eSIM profile is considered to be the eSIM profile associated with the default QoS feature in the first eSIM, the default QoS feature in the first eSIM can be enabled. The video streaming application can be accessed through the eSIM profile associated with the default QoS feature in the first eSIM.

Figure 9D:
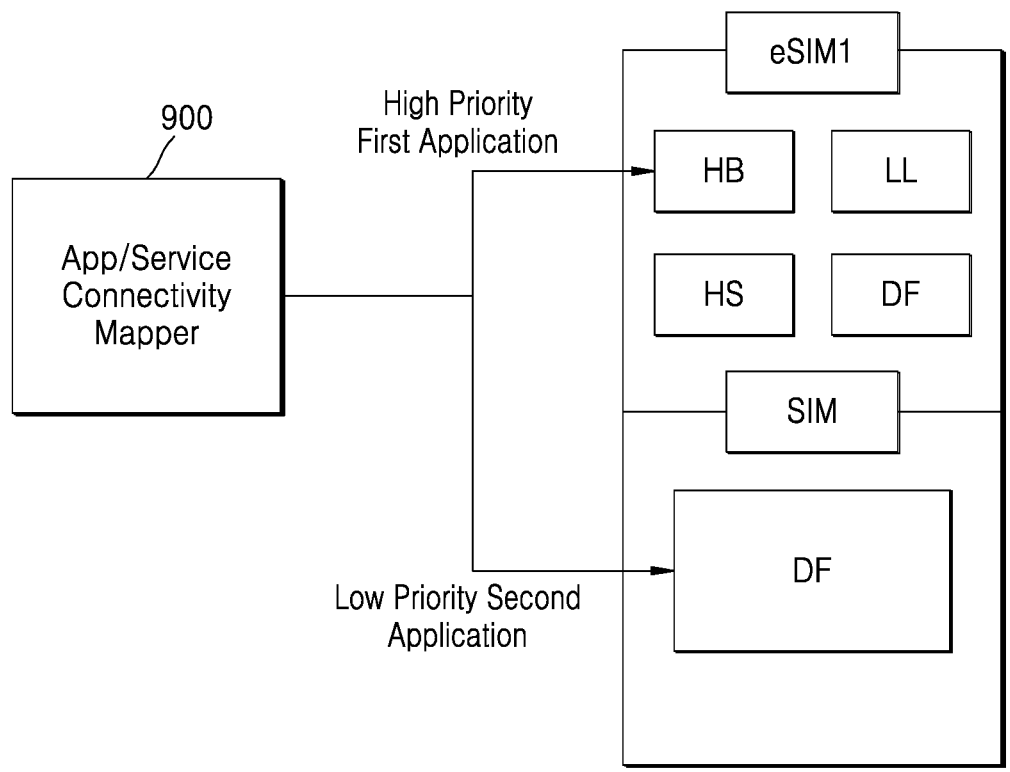
FIG. 9D is a use case scenario illustrating conflict resolution using priorities assigned to applications and services in the device, according to an embodiment of the disclosure.

FIG. 9D is a use case scenario illustrating conflict resolution using priorities assigned to applications and services in the device 300, according to an embodiment of the disclosure.

In an example, consider that the device 300 includes an eSIM 1 and an ordinary SIM. The eSIM comprises of four downloaded profiles, associated with the QoS features of high bandwidth, low latency, high security, and default. The user can subscribe to a default plan (labeled as DF) on the ordinary SIM.

Referring to FIG. 9D, consider that the user is accessing a first application assigned with a high priority, which is mapped to the eSIM profile associated with the high bandwidth QoS feature. In this situation, consider that the user launches a second application assigned with a low priority and mapped to the same eSIM profile associated with the high bandwidth QoS feature. As two applications mapped to the same eSIM profile attempt to use the eSIM profile to send/receive data at the same time, a conflict arises.

The embodiments include allowing the first application to continue using the eSIM profile to send/receive data, as the first application is assigned with higher priority. The embodiments allow the second application to send/receive data through the default plan on the ordinary SIM to resolve the conflict.

Figure 9E:
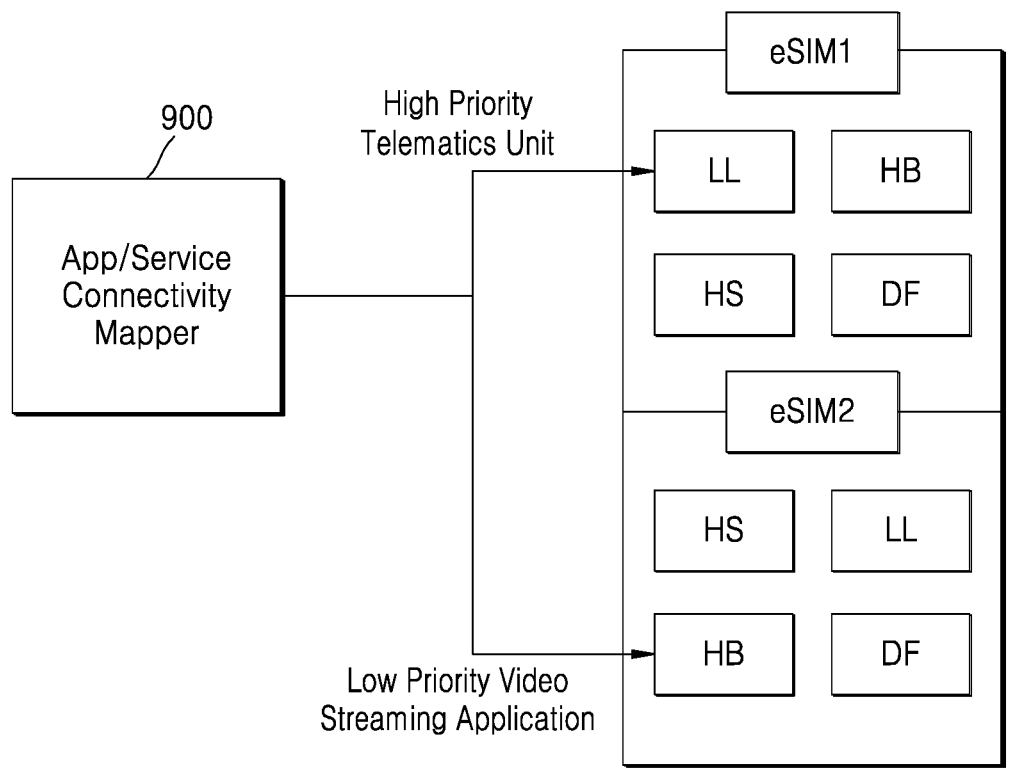
FIG. 9E is another use case scenario illustrating conflict resolution using priorities assigned to applications and services in the device, according to an embodiment of the disclosure.

FIG. 9E is another use case scenario illustrating conflict resolution using priorities assigned to applications and services in the device 300, according to an embodiment of the disclosure.

In an example, consider that the device 300 is a connected car. The connected car includes two eSIMs (eSIM1 and eSIM2). Each eSIM comprises of four downloaded profiles, which are associated with the QoS features of high bandwidth, low latency, high security, and default.

Referring to FIG. 9E, consider that the user (driver) is using a telematics unit. The telematics unit can be a gateway that can retrieve and relay information about infrastructure (such as a warning about damaged road ahead). The telematics unit can be assigned with a high priority, which is mapped to an eSIM profile associated with the low latency QoS feature in the first eSIM. In this situation, consider that the user launches a video streaming application assigned with a low priority and mapped to the eSIM profile associated with the high bandwidth QoS feature in the second eSIM. If the connected car can enable only one of the eSIMs at a particular time instant, a conflict is likely to arise. The conflict arises as the video streaming application attempts to send/receive data using the high bandwidth eSIM profile in the second eSIM, while the telematics unit (assigned with high priority) is using the low latency profile on the first eSIM to send/receive data.

In order to resolve the conflict, the connected car may lock the video streaming application (assigned with low priority) or make it inaccessible to the user. Consequently, the user may not be able to access the video streaming application. However, if the connected car is able to enable both eSIMs simultaneously, the user is able to access the video streaming application using the high bandwidth eSIM profile in the second eSIM.

In an embodiment, if the connected car includes a single eSIM, comprising of four profiles, each associated with QoS features, and an ordinary SIM, then the video streaming application can be allowed to send/receive data through the default plan on the ordinary SIM, for resolving the conflict.

In case the connected car includes only a single eSIM (and the ordinary SIM, including the default profile is not available), then an application/service assigned with a higher priority can take precedence and the QoS profile of the higher priority application/service can be used for other applications/services.

Figure 9F:
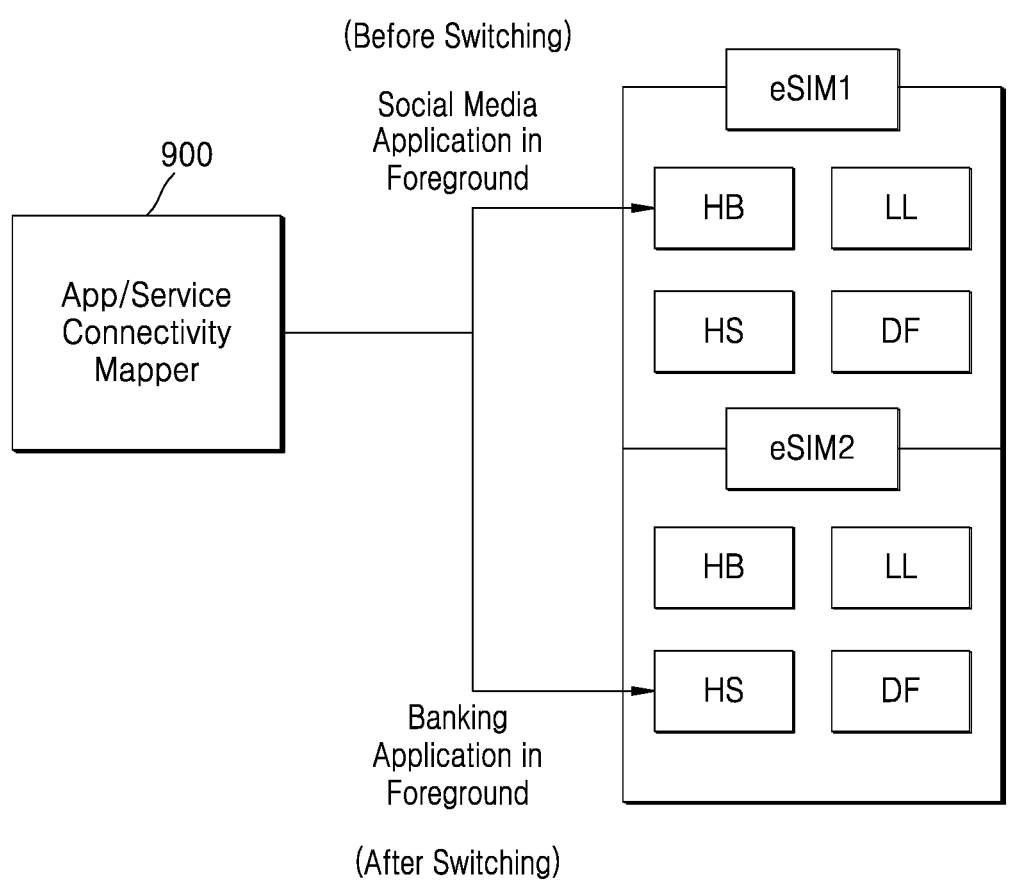
FIG. 9F is a use case scenario illustrating switching of eSIM profiles based on switching of applications in the foreground, according to an embodiment of the disclosure.

FIG. 9F is a use case scenario illustrating switching of eSIM profiles based on switching of applications in the foreground, according to an embodiment of the disclosure.

Referring to FIG. 9F, consider that the user is using a social media application. The social media application is being displayed in the foreground. The social media application can be mapped to an eSIM profile associated with the high bandwidth QoS feature in the first eSIM.

If the user launches a banking application mapped with an eSIM profile associated with the high security QoS feature in the second eSIM, the banking application will be displayed in the foreground. Therefore, the embodiments include switching from the high bandwidth eSIM profile on the first eSIM to the high security eSIM profile on the second eSIM.

In an embodiment, if the banking application is mapped with an eSIM profile associated with the high security QoS feature in the first eSIM the banking application will be displayed in the foreground and the high security eSIM profile on the first eSIM can be enabled.

Figure 10A:
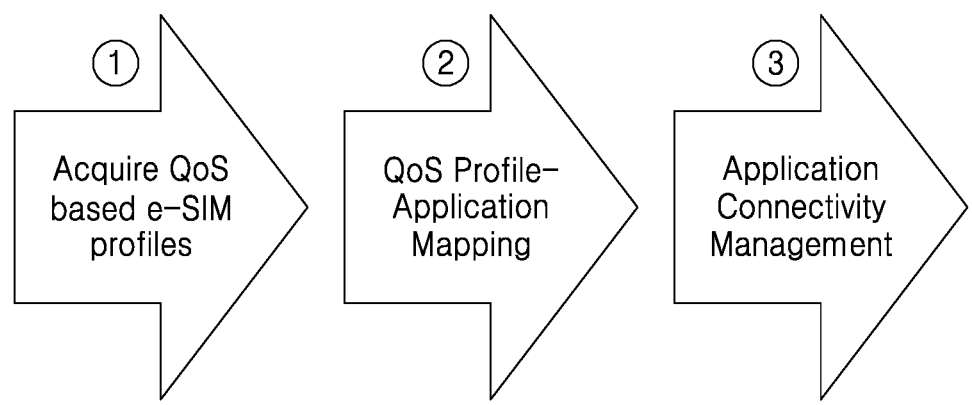
FIG. 10A illustrates a schematic diagram for overview of differentiated application connectivity, according to an embodiment of the disclosure.

FIG. 10A illustrates a schematic diagram for overview of differentiated application connectivity, according to an embodiment of the disclosure.

Embodiments herein provide systems and methods for dynamically mapping each of an application to an electronic SIM (e-SIM) profile in an electronic device that in turn will be mapped to a 5G network slice by carriers. Embodiments herein provide mechanism for systems and methods to dynamically switch profile during the usage of application in the electronic device. Embodiments herein provide network slicing (such as 5G network) capability to a user.

In an embodiment, the system may include connectivity management module to dynamically configure application(s) to e-SIM profiles. In an embodiment, the connectivity management module comprises a profile association learning module. In an embodiment, profile association learning module is configured to associate application(s)/service(s) with their primary profiles and secondary profiles, based on the characteristics of the application(s)/service(s) and a user behavior. In an embodiment, the system is configured to monitoring a Quality of Service or a Quality of Experience (QoS/QoE) level during usage of each application. The system is configured to recommend the user to switch/change mapping of the profile.

Referring to FIG. 10A, at a first step, systems and methods includes acquire QoS based e-SIM profiles. In an embodiment, acquiring multiple e-SIM profiles with a different QoS. At a second step systems and methods includes intelligent association of applications to QoS profiles, based on nature/characteristics of application and user behavior. At a third step systems and methods includes allotting specific QoS profile to applications for connectivity at the run-time based on availability (for QoS profiles) and associated preference of the applications.

Figure 10B:
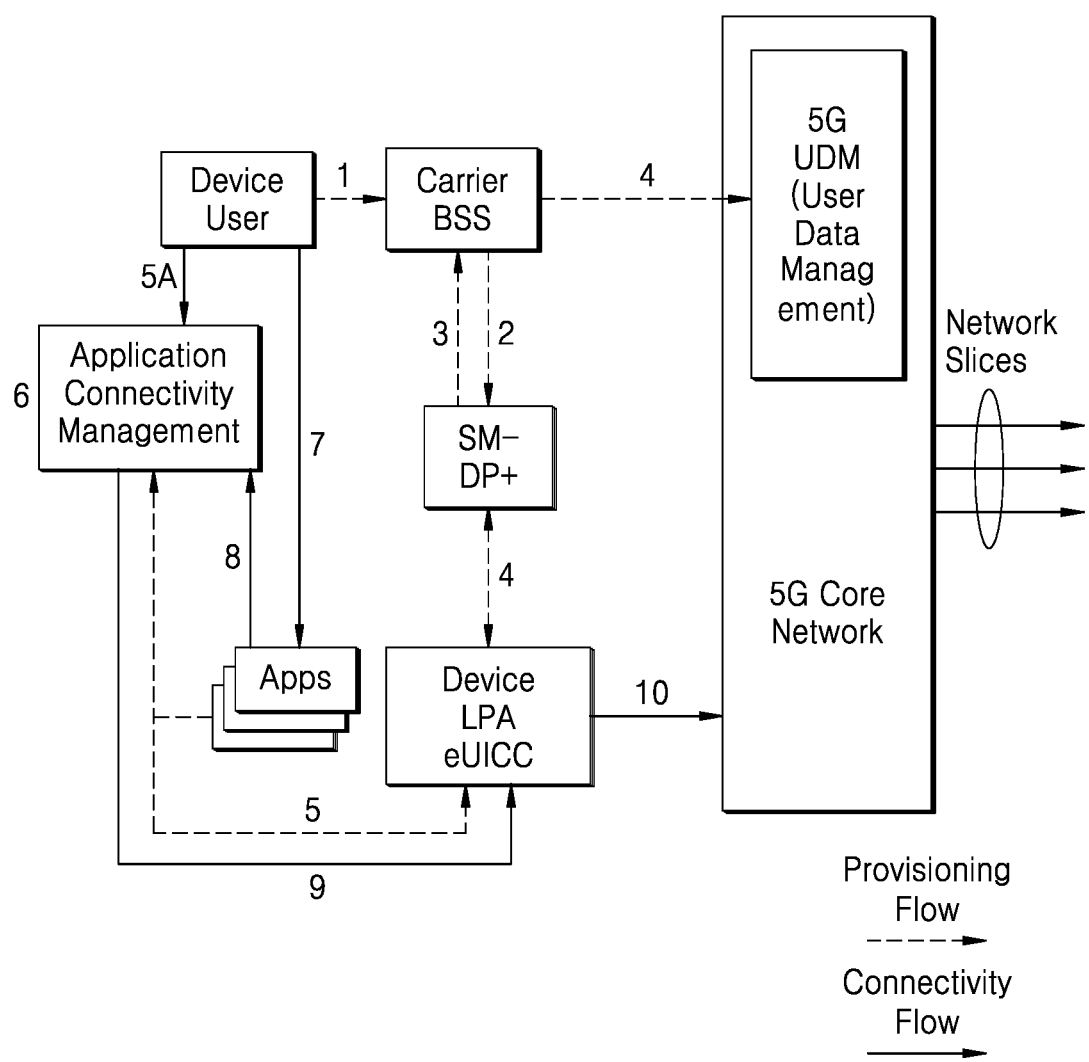
FIG. 10B illustrates a block diagram for service flow of differentiated application connectivity, according to an embodiment of the disclosure.

FIG. 10B illustrates a block diagram for service flow of differentiated application connectivity, according to an embodiment of the disclosure.

Referring to FIG. 10B, at a first step 1, requesting multiple profiles with different QoS. At a second step 2, downloading order and confirming order. At a third step 3, approving/acknowledging the profiles/orders. At a fourth step 4, download e-SIM profiles (i.e. multiple profiles based on different QoS requested). At a fifth step 5, automatically associating intelligent profile with apps (on profile installation as well as installation of a new app). At a sub step of fifth step (5A) validating/updating application to profile mapping. At a sixth step 6 appending embedded Universal Integrated Circuit Card (e-UICC) profiles to application(s) map. At a seventh step 7, launch application(s). At an eighth step 8, connecting corresponding profile. At a ninth step 9, enabling corresponding profile and switching the current application to secondary profile. At a tenth step 10, network connection on appropriate slice.

Figure 11:
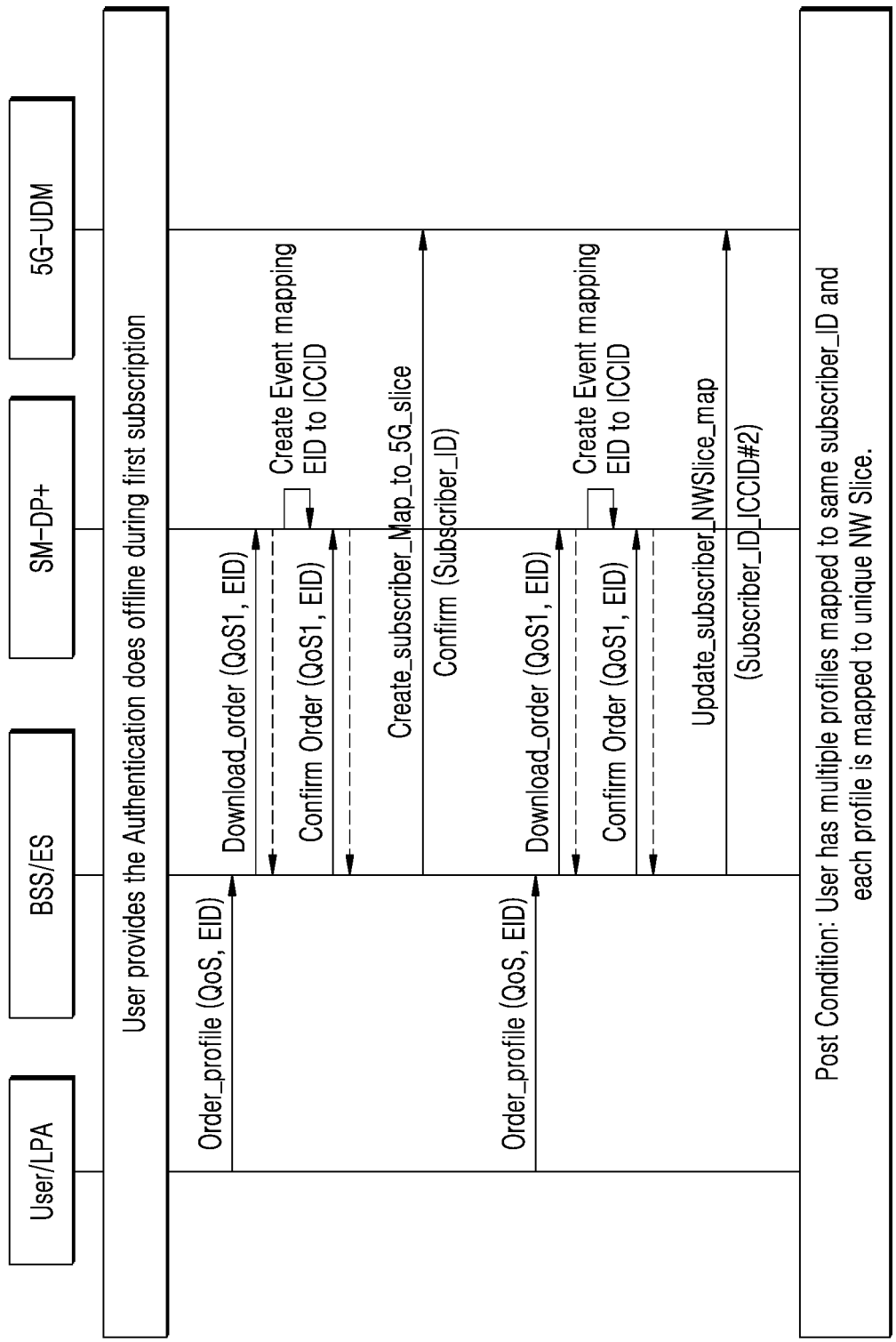
FIG. 11 illustrates a sequence diagram for acquiring Quality of Service (QoS) based electronic SIM (e-SIM) profiles, according to an embodiment of the disclosure.

FIG. 11 illustrates a sequence diagram for acquiring QoS based e-SIM profiles, according to an embodiment of the disclosure.

In an embodiment, multiple e-SIM profile may be provided and a User Data Management (UDM) may be attached to subscriber Identity (ID). In an embodiment, user may provide the authentication document(s) offline during first subscription. In an embodiment, user may be provided with multiple profiles mapped to same subscriber ID and each profile may be mapped to unique network slice.

Figure 12:
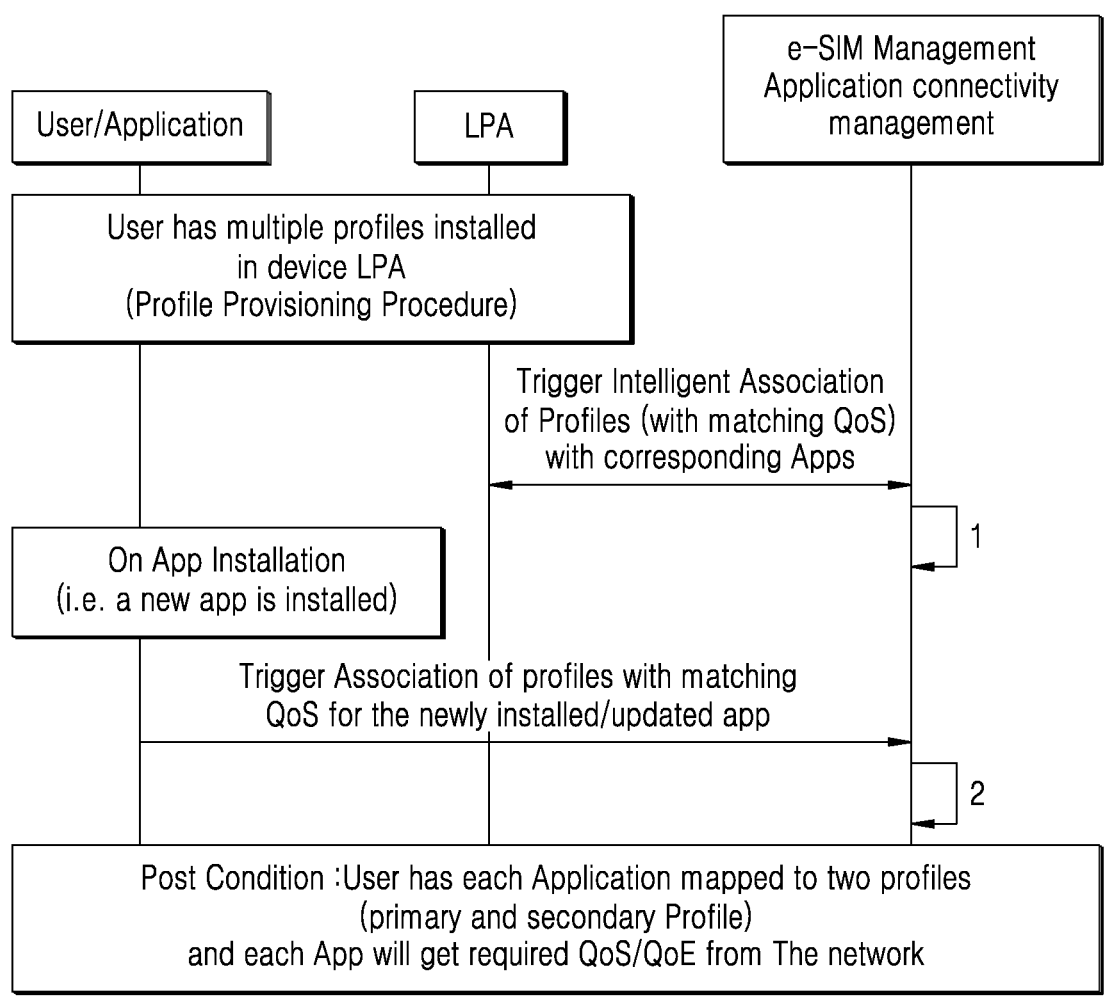
FIG. 12 illustrates a sequence diagram for mapping application to QoS profile, according to an embodiment of the disclosure.

FIG. 12 illustrates a sequence diagram for mapping application to QoS profile, according to an embodiment of the disclosure.

Referring to FIG. 12, user may have multiple profiles installed in a Local Profile Assistant (LPA) of the electronic device (i.e. Profile Provisioning Procedure). In an embodiment, triggering intelligent association of profiles (with matching QoS) with corresponding application(s) may be performed. In an embodiment, at a first step 1, a mapping between application(s) and corresponding primary/secondary profiles may be created based on nature/characteristics of application and user behavior. In an embodiment, application may be installed (i.e. new application). In an embodiment, association of profiles may be triggered with matching QoS for the newly installed/updated application. In an embodiment, at a second step 2, the user may review app connection management and may view list of applications and may map them to different primary profile and secondary profile. In an embodiment, user may be provided with each application mapped to two profiles (primary and secondary Profile) and each application may receive required QoS/QoE from the network.

Figure 13:
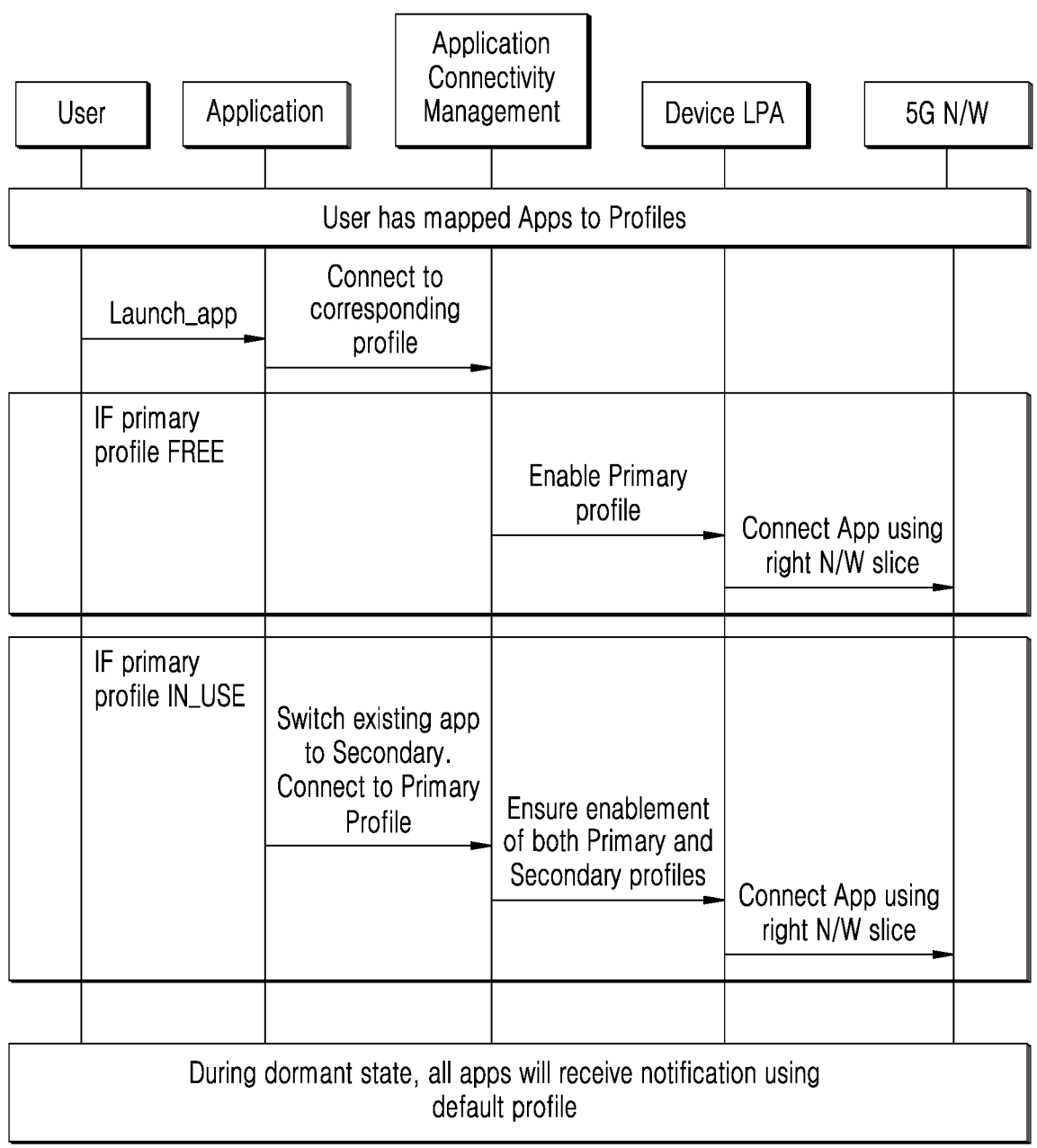
FIG. 13 illustrates a sequence diagram for management application connectivity, according to an embodiment of the disclosure.

FIG. 13 illustrates a sequence diagram for management application connectivity, according to an embodiment of the disclosure.

Referring to FIG. 13, user may be provided with mapped apps to profiles. In an embodiment, applications may be launched. In an embodiment, connecting to corresponding profile may be performed. In an embodiment, if primary profile is free to use, then enabling primary profile is performed and connecting application using right network slice may be performed. In an embodiment, if primary profile is in use, then existing application is switched (associated with primary profile) to secondary and connecting to primary profile. In an embodiment, enablement of both primary and secondary profiles is ensured. In an embodiment, application is connected using appropriate network slice. In an embodiment, during dormant state, all applications may receive notification using default profile Embodiments herein provide systems and methods for providing optimal network connectivity to each application(s) in the electronic device. Embodiments herein may leverage e-SIM technology to load the electronic device with multiple profiles. Embodiments herein may percolates down the 5G network slicing that may be advantage to end consumers. Embodiments herein may enable users to select the desired QoS for apps for optimized cost. Embodiments herein discloses 5G User Data Management (UDM) server to map subscriber profile to network slice.

Figure 14:
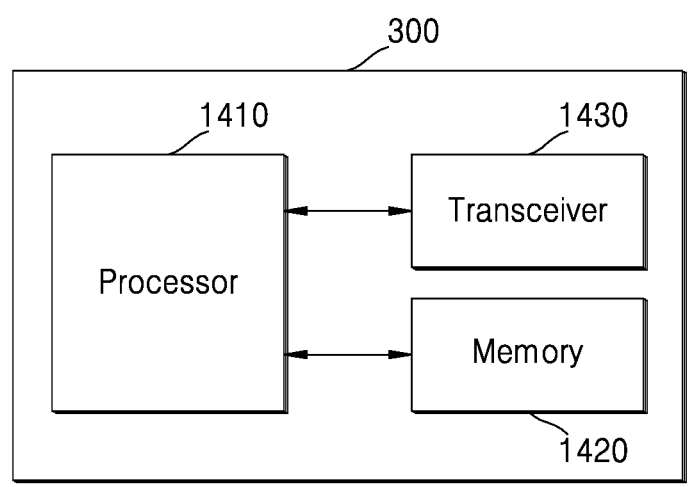
FIG. 14 is a block diagram illustrating an internal structure of device according to an embodiment of the disclosure.

FIG. 14 is a block diagram illustrating an internal structure of device according to an embodiment of the disclosure.

Specifically, FIG. 14 is a block diagram illustrating the internal structure of the device 300 according to an embodiment of the disclosure. Referring to FIG. 14, the device 300 of the disclosure may include a processor 1410, a transceiver 1430, and memory 1420. However, components of the device 300 are not limited to the examples set forth above. For example, the device 300 may include more components or less components than the components set forth above. In addition, the processor 1410, the transceiver 1430, and the memory 1420 may be implemented in the form of one chip.

The processor 1410 may control a series of processes in which the device 300 may be operated according to the above-described embodiments of the disclosure. For example, the processor 1410 may control the transceiver 1430 to receive a plurality of embedded Subscriber Identity Module (eSIM) profiles, wherein each eSIM profile is associated with at least one Quality of Service (QoS) feature, perform a primary mapping between the plurality of eSIM profiles and applications available on the device based on QoS requirements of the applications, and perform transfer of data belonging to the applications using the mapped eSIM profiles corresponding to the primary mapping.

The transceiver 1430 may transmit a signal to and receive a signal from a gNB. The signal set forth above may include control information and data. For this purpose, the transceiver 1430 may include a radio frequency (RF) transmitter up-converting and amplifying a frequency of a transmitted signal, an RF receiver performing low-noise amplification and frequency down-conversion on a received signal, and the like. In addition, the transceiver 1430 may receive a signal through a radio channel and output the signal to the processor 1410, and may transmit, through the radio channel, a signal that is output from the processor 1410.

The memory 1420 may store at least one of information transmitted and received by the transceiver 1430 or information generated by the processor 1410. In addition, the memory 1420 may store control information or data included in an acquired signal. The memory 1420 may include a storage medium such as read-only memory (ROM), random access memory (RAM), a hard disk, compact disc ROM (CD-ROM), and a digital versatile disc (DVD), or a combination of storage media. Further, the memory 920 may include a plurality of memories.

According to an embodiment of the disclosure, a method for providing an application (or) a service specific subscription profiles for a device (300) is provided. The method includes receiving, by the device (300), a plurality of embedded Subscriber Identity Module (eSIM) profiles, wherein each eSIM profile is associated with at least one Quality of Service (QoS) feature, performing, by the device (300), a primary mapping between the plurality of eSIM profiles and applications (or) services available on the device (300) based on QoS requirements of the applications (or) services; and performing, by the device (300), transfer of data belonging to the applications (or) services using the mapped eSIM profiles corresponding to the primary mapping.

In the embodiment, wherein the QoS requirements are default QoS requirements associated, by a server (505), to the applications (or) services, wherein the device (300) retrieves the default QoS requirements from the server (505), wherein the server (505) associates the default QoS requirements based on at least one of genre, category, and description, of the applications (or) services.

In the embodiment, wherein the data belonging to the applications (or) services is transferred using network slices facilitating the QoS requirements of the applications (or) services, wherein the network slices are associated with the mapped eSIM profiles corresponding to the primary mapping.

In the embodiment, wherein the QoS requirements of the applications (or) services are one of similar to the QoS features associated with the eSIM profiles, and same as the QoS features associated with the eSIM profiles.

In the embodiment, wherein the method further includes monitoring, by the device (300), at least one of usage pattern, content, and context, of the applications (or) services, identifying, by the device (300), a change in the QoS requirements of the applications (or) services based on at least one of the monitored usage pattern, content, and context, of the applications (or) services, selecting, by the device (300), eSIM profiles from the plurality of eSIM profiles for performing a secondary mapping with the applications (or) services, based on the identified change in QoS requirements of the applications (or) services, performing, by the device (300), the secondary mapping between the applications (or) services and the selected eSIM profiles, and performing, by the device (300), transfer of data belonging to the applications (or) services using the eSIM profiles corresponding to the secondary mapping.

In the embodiment, wherein the current QoS requirements of the applications (or) services are one of similar to the QoS features associated with the selected eSIM profiles, and same as the QoS features associated with the selected eSIM profiles.

In the embodiment, wherein the usage pattern is determined based on at least one of time of usage of features of the applications (or) services, locations of usage of the features, and data consumption during each session; wherein the context is determined based on at least one of the usage pattern, settings of the device (300) when the applications (or) services are launched, mode of usage of the applications (or) services; wherein the content is determined based on at least one of type of content, and quality of content, accessed during each data session.

In the embodiment, wherein the method further includes assigning priorities to the applications (or) services mapped to same eSIM profile, wherein the applications (or) services are selected for data transfer through the eSIM profile based on the assigned priorities.

In the embodiment, wherein the method further includes assigning priorities to the applications (or) services mapped to different eSIM profiles if the device (300) enables data transfer through a single eSIM profile at a time instant, wherein the applications (or) services are selected for data transfer through the mapped eSIM profiles based on the assigned priorities.

In the embodiment, wherein the primary mapping is based on a similarity between the QoS feature associated with each eSIM profile and the QoS requirements of the applications.

According to another embodiment of the disclosure, a method for providing application (or) service specific subscription profiles for a device (300) is provided. The method includes receiving, by the device (300), a plurality of embedded Subscriber Identity Module (eSIM) profiles, wherein each eSIM profile is associated with at least one Quality of Service (QoS) feature, performing, by the device (300), a primary mapping between the plurality of eSIM profiles and applications (or) services in the device (300) based on QoS requirements of the applications (or) services, monitoring, by the device (300), at least one of usage pattern, content, and context, of the applications (or) services, selecting, by the device (300), eSIM profiles for performing a secondary mapping with the applications (or) services based on at least one of the usage pattern, content, context, of the applications (or) services, performing, by the device (300), the secondary mapping between the applications (or) services and the selected eSIM profiles, and performing, by the device (300), transfer of data belonging to the applications (or) services through the selected eSIM profiles.

According to another embodiment of the disclosure, a device (300) for providing differentiated network connectivity to applications (or) services is provided. The device (300) configured to receive a plurality of embedded Subscriber Identity Module (eSIM) profiles, wherein each eSIM profile is associated with at least one Quality of Service (QoS) feature, perform a primary mapping between the plurality of eSIM profiles and the applications (or) services available on the device (300) based on QoS requirements of the applications (or) services, and perform transfer of data belonging to the applications (or) services using the mapped eSIM profiles corresponding to the primary mapping.

In another embodiment, wherein the QoS requirements are default QoS requirements associated, by a server (505), to the applications (or) services, wherein the device (300) is configured to retrieve the default QoS requirements from the server (505), wherein the server (505) associates the default QoS requirements based on at least one of genre, category, and description, of the applications (or) services.

In another embodiment, wherein data belonging to the applications (or) services is transferred using network slices facilitating the QoS requirements of the applications (or) services, wherein the network slices are associated with the mapped eSIM profiles corresponding to the primary mapping.

In another embodiment, wherein the QoS requirements of the applications (or) services are one of similar to the QoS features associated with the eSIM profiles, and same as the QoS features associated with the eSIM profiles.

In another embodiment, wherein the device (300) is further configured to monitor at least one of usage pattern, content, and context, of the applications (or) services, identify a change in the QoS requirements of the applications (or) services based on at least one of the monitored usage pattern, content, context, of the applications (or) services, select eSIM profiles for performing a secondary mapping with the applications (or) services based on the identified change in QoS requirements of the applications (or) services, perform the secondary mapping between the applications (or) services and the selected eSIM profiles, and perform transfer of data belonging to the applications (or) services using the selected eSIM profiles corresponding to the secondary mapping.

In another embodiment, wherein the current QoS requirements of the applications (or) services are one of similar to the QoS features associated with the selected eSIM profiles, and same as the QoS features associated with the selected eSIM profiles.

In another embodiment, wherein the usage pattern is determined based on at least one of time of usage of features of the applications (or) services, locations of usage of the features, and data consumption during each session; wherein the context is determined based on at least one of the usage pattern, settings of the device (300) when the applications (or) services are launched, mode of usage of the applications (or) services; wherein the content is determined based on at least one of type of content, and quality of content, accessed during each data session.

In another embodiment, wherein the device (300) is further configured to assign priorities to the applications (or) services mapped to a same eSIM profile, wherein the application (or) services are selected for data transfer through the eSIM profile based on the assigned priorities.

In another embodiment, wherein the device (300) is further configured to assign priorities to the applications (or) services mapped to different eSIM profiles if the device (300) enables data transfer through a single eSIM profile at a time instant, wherein the application (or) services are selected for data transfer through the mapped eSIM profiles based on the assigned priorities.

In another embodiment, wherein the primary mapping is based on a similarity between the QoS feature associated with each eSIM profile and the QoS requirements of the applications.

The embodiments disclosed herein can be implemented through at least one software program running on at least one hardware device and performing network management functions to control the network elements. The network elements shown in FIG. 5 include blocks which can be at least one of a hardware device, or a combination of hardware device and software module.

The embodiments disclosed herein describe methods and systems for providing differentiated network connectivity to applications and services in a device based on QoS requirements of the applications and services, wherein the differentiated network connectivity is provided using eSIM profiles and network slicing. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an Application-Specific Integrated Circuit (ASIC), or a combination of hardware and software means, e.g. an ASIC and a Field-Programmable Gate Array (FPGA), or at least one microprocessor and at least one memory with software modules located therein. The method embodiments described herein could be implemented partly in hardware and partly in software. Alternatively, the disclosure may be implemented on different hardware devices, e.g. using a plurality of Central Processing Units (CPUs).

The foregoing is merely illustrative of the preferred embodiments of the disclosure, and is not intended to limit the disclosure. Any modifications, equivalents, improvements, etc., which are made within the spirit and principle of the disclosure, should be included in the scope of the disclosure.

It is to be appreciated by those skilled in the art that any of the devices involving the performance of one or more of the operations described herein is included in the scope of the disclosure. These devices may be specially designed and manufactured for desired purposes, or may also include a known device(s) in a general purpose computer. These devices have computer programs stored therein that are selectively activated or reconfigured. Such computer programs may be stored in a device (e.g., computer) readable medium or in any type of medium suitable for storing electronic instructions and coupled to a bus, respectively. The computer readable medium may include but is not limited to any type of disk (including a floppy disk, a hard disk, an optical disk, a CD-ROM, and a magnetic optical disk), Read-Only Memory (ROM), Random Access Memory (RAM), Erasable Programmable Read-Only Memory (EPROM), Electrically Erasable Programmable Read-Only Memory (EEPROM), flash memory, magnetic card or optical card. That is to say, the readable medium may include any medium that stores or transmits information in a device (e.g., computer) readable manner.

It is to be appreciated by those skilled in the art that each of the blocks in the structure diagrams and/or block diagrams and/or flow diagrams and combinations of the blocks in the structure diagrams and/or block diagrams and/or flow diagrams may be implemented by the computer program instructions. It is to be appreciated by those skilled in the art that such computer program instructions may be provided to a general purpose computer, a dedicated computer, or other programmable processor that may execute data processing methods, such that the scheme specified by one or more blocks in the structure diagrams and/or block diagrams and/or flow diagrams disclosed in the disclosure may be executed by the computer or the other programmable processor that may execute data processing methods.

It is to be understood by those skilled in the art that the steps, means, and schemes in various operations, methods, and processes that have been discussed in the disclosure may be replaced, modified, combined, or deleted. Further, other steps, means, and schemes in various operations, methods, and processes that have been discussed in the disclosure may also be replaced, modified, rearranged, divided, combined, or deleted. Still further, the steps, means, and schemes in various operations, methods, and processes that have been discussed in the disclosure may also be replaced, modified, rearranged, divided, or combined with the steps, means, and schemes in the prior art.

The foregoing is merely a part of the implementations of the disclosure, and it should be noted that various improvements and polishing may be made by those skilled in the art without departing from the principles of the disclosure. And the improvements and polishing should be considered as being within the scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for operating a device in a wireless communication system, the method comprising:
   receiving a plurality of embedded subscriber identity module (eSIM) profiles, each eSIM profile being associated with at least one quality of service (QoS) feature;
   performing a primary mapping between the plurality of eSIM profiles and applications available on the device based on QoS requirements of the applications; and
   performing transfer of data belonging to the applications using the mapped eSIM profiles corresponding to the primary mapping,
   wherein the data includes first data belonging to a first application mapped to a first eSIM profile and second data belonging to a second application mapped to a second eSIM profile, and
   wherein, among the mapped eSIM profiles, the first eSIM profile is used for performing transfer of the first data and the second eSIM profile is used for performing transfer of the second data.

2. The method of claim 1,
   wherein the QoS requirements are default QoS requirements associated, by a server, to the applications,
   wherein the device retrieves the default QoS requirements from the server, and
   wherein the server associates the default QoS requirements based on at least one of genre, category, or description of the applications.

3. The method of claim 1,
   wherein the data belonging to the applications is transferred using network slices facilitating the QoS requirements of the applications, and
   wherein the network slices are associated with the mapped eSIM profiles corresponding to the primary mapping.

4. The method of claim 1, wherein the QoS requirements of the applications are one of similar to the QoS features associated with the eSIM profiles, and same as the QoS features associated with the eSIM profiles.

5. The method of claim 1, further comprising:
   monitoring at least one of usage pattern, content, or context of the applications;
   identifying a change in the QoS requirements of the applications based on at least one of the monitored usage pattern, content, or context, of the applications;
   selecting eSIM profiles from the plurality of eSIM profiles for performing a secondary mapping with the applications, based on the identified change in QoS requirements of the applications;
   performing the secondary mapping between the applications and the selected eSIM profiles; and
   performing transfer of data belonging to the applications using the eSIM profiles corresponding to the secondary mapping.

6. The method of claim 5, wherein the current QoS requirements of the applications are one of similar to the QoS features associated with the selected eSIM profiles, and same as the QoS features associated with the selected eSIM profiles.

7. The method of claim 5,
   wherein the usage pattern is determined based on at least one of time of usage of features of the applications, locations of usage of the features, or data consumption during each session,
   wherein the context is determined based on at least one of the usage pattern, settings of the device when the applications are launched, or mode of usage of the applications, and
   wherein the content is determined based on at least one of type of content, or quality of content accessed during each data session.

8. The method of claim 1, further comprising:
   assigning priorities to the applications mapped to same eSIM profile,
   wherein the applications are selected for data transfer through the eSIM profile based on the assigned priorities.

9. The method of claim 1, further comprising:
   assigning priorities to the applications mapped to different eSIM profiles if the device enables data transfer through a single eSIM profile at a time instant,
   wherein the applications are selected for data transfer through the mapped eSIM profiles based on the assigned priorities.

10. The method of claim 1, further comprising:
    monitoring at least one of usage pattern, content, or context of the applications;
    selecting eSIM profiles for performing a secondary mapping with the applications based on at least one of the usage pattern, content, or context of the applications;
    performing the secondary mapping between the applications and the selected eSIM profiles; and
    performing transfer of data belonging to the applications through the selected eSIM profiles.

11. A device in a wireless communication system, the device comprising:

a transceiver; and
a processor configured to:
- control the transceiver to receive a plurality of embedded subscriber identity module (eSIM) profiles, each eSIM profile being associated with at least one quality of service (QoS) feature,
- perform a primary mapping between the plurality of eSIM profiles and applications available on the device based on QoS requirements of the applications, and
- perform transfer of data belonging to the applications using the mapped eSIM profiles corresponding to the primary mapping,
- wherein the data includes first data belonging to a first application mapped to a first eSIM profile and second data belonging to a second application mapped to a second eSIM profile, and
- wherein, among the mapped eSIM profiles, the first eSIM profile is used for performing transfer of the first data and the second eSIM profile is used for performing transfer of the second data.

12. The device of claim 11,
- wherein the QoS requirements are default QoS requirements associated, by a server, to the applications,
- wherein the device retrieves the default QoS requirements from the server, and
- wherein the server associates the default QoS requirements based on at least one of genre, category, or description of the applications.

13. The device of claim 11,
- wherein the data belonging to the applications is transferred using network slices facilitating the QoS requirements of the applications, and
- wherein the network slices are associated with the mapped eSIM profiles corresponding to the primary mapping.

14. The device of claim 11, wherein the QoS requirements of the applications are one of similar to the QoS features associated with the eSIM profiles, and same as the QoS features associated with the eSIM profiles.

15. The device of claim 11, wherein the processor is further configured to:
- monitor at least one of usage pattern, content, or context of the applications,
- identify a change in the QoS requirements of the applications based on at least one of the monitored usage pattern, content, and context, of the applications,
- select eSIM profiles from the plurality of eSIM profiles for performing a secondary mapping with the applications, based on the identified change in QoS requirements of the applications,
- perform the secondary mapping between the applications and the selected eSIM profiles, and
- perform transfer of data belonging to the applications using the eSIM profiles corresponding to the secondary mapping.

16. The device of claim 15, wherein the current QoS requirements of the applications are one of similar to the QoS features associated with the selected eSIM profiles, and same as the QoS features associated with the selected eSIM profiles.

17. The device of claim 15,
- wherein the usage pattern is determined based on at least one of time of usage of features of the applications, locations of usage of the features, or data consumption during each session,
- wherein the context is determined based on at least one of the usage pattern, settings of the device when the applications are launched, or mode of usage of the applications, and
- wherein the content is determined based on at least one of type of content, or quality of content accessed during each data session.

18. The device of claim 11, wherein the processor is further configured to:
- assign priorities to the applications mapped to same eSIM profile,
- wherein the applications are selected for data transfer through the eSIM profile based on the assigned priorities.

19. The device of claim 11, wherein the processor is further configured to:
- assign priorities to the applications mapped to different eSIM profiles if the device enables data transfer through a single eSIM profile at a time instant,
- wherein the applications are selected for data transfer through the mapped eSIM profiles based on the assigned priorities.

20. The device of claim 11, the processor is further configured to:
- monitor at least one of usage pattern, content, or context of the applications,
- select eSIM profiles for performing a secondary mapping with the applications based on at least one of the usage pattern, content, or context of the applications,
- perform the secondary mapping between the applications and the selected eSIM profiles, and
- perform transfer of data belonging to the applications through the selected eSIM profiles.

* * * * *